United States Patent [19]

Hoffman

[11] Patent Number: 5,344,330
[45] Date of Patent: Sep. 6, 1994

[54] ELECTRICAL CONNECTOR ASSEMBLY, ESPECIALLY FOR ELECTRIC VEHICLE

[75] Inventor: Ernest G. Hoffman, Middlefield, Conn.

[73] Assignee: Hubbell Incorporated, Orange, Conn.

[21] Appl. No.: 5,108

[22] Filed: Jan. 15, 1993

[51] Int. Cl.⁵ .......................................... H01R 13/453
[52] U.S. Cl. ..................................... 439/138; 439/310
[58] Field of Search ............ 439/34, 35, 131, 136–141, 439/259, 310, 341, 474, 923

[56] References Cited

U.S. PATENT DOCUMENTS

| | | | |
|---|---|---|---|
| 3,270,267 | 8/1966 | Nolte, Jr. | 439/923 |
| 3,950,059 | 4/1976 | Anhalt et al. | 439/261 |
| 3,952,239 | 4/1976 | Owings et al. | 320/2 |
| 4,158,802 | 6/1979 | Rose II | 302/2 |
| 4,188,084 | 2/1980 | Buresi et al. | 439/265 |
| 4,203,640 | 5/1980 | Bice et al. | 439/139 |
| 4,217,019 | 8/1980 | Cameron | 439/138 |
| 4,431,241 | 2/1984 | Hazelhurt | 439/138 |
| 4,624,472 | 11/1986 | Stuart et al. | 280/420 |
| 4,701,003 | 10/1987 | Gruet | 439/680 |
| 4,718,862 | 1/1988 | Beeman | 439/482 |
| 4,843,477 | 6/1989 | Mizutani et al. | 358/248 |
| 5,030,129 | 7/1991 | Koch | 439/140 |
| 5,104,331 | 4/1992 | Goble | 439/341 |
| 5,174,772 | 12/1992 | Vranish | 439/310 |

FOREIGN PATENT DOCUMENTS

| | | | |
|---|---|---|---|
| 0049625 | 4/1982 | European Pat. Off. | 439/350 |
| 1926582 | 11/1970 | Fed. Rep. of Germany | 439/345 |
| 208053 | 3/1968 | U.S.S.R. | 439/345 |

OTHER PUBLICATIONS

"Infrastructure-EV Charging Meter", Green Car Journal, Nov. 1992, p. 124.

Primary Examiner—Neil Abrams
Attorney, Agent, or Firm—Jerry M. Presson; David L. Tarnoff

[57] ABSTRACT

An electrical connector assembly for transmitting electrical energy, and especially designed for use with electric vehicles. The electrical connector assembly includes a male electrical connector or plug with electrical contacts and a female electrical connector or receptacle with matting electrical contacts. Both the receptacle and the plug has a cover for selectively covering and uncovering its electrical contacts to prevent inadvertent contact with the electrical contacts and to protect the electrical contacts from the environment. In the preferred embodiment, the covers of the plug and receptacle are automatically uncovered and the receptacle contacts are moved transversely to the plug insertion direction and into contact with the plug female contacts only after full insertion of the plug into the receptacle. The plug can be inserted into the receptacle with little or no force by the user since the contacts of the plug and receptacle are not electrically coupled together until after full insertion of the plug into the receptacle. In an alternate embodiment, the electrical connector assembly is provided with a break-away feature which disconnects the contacts of the receptacle from the contacts of the plug to prevent damage of the electrical connector assembly, upon application of a highly excessive force pulling the plug away from the receptacle prior to disengagement of the contacts.

60 Claims, 16 Drawing Sheets

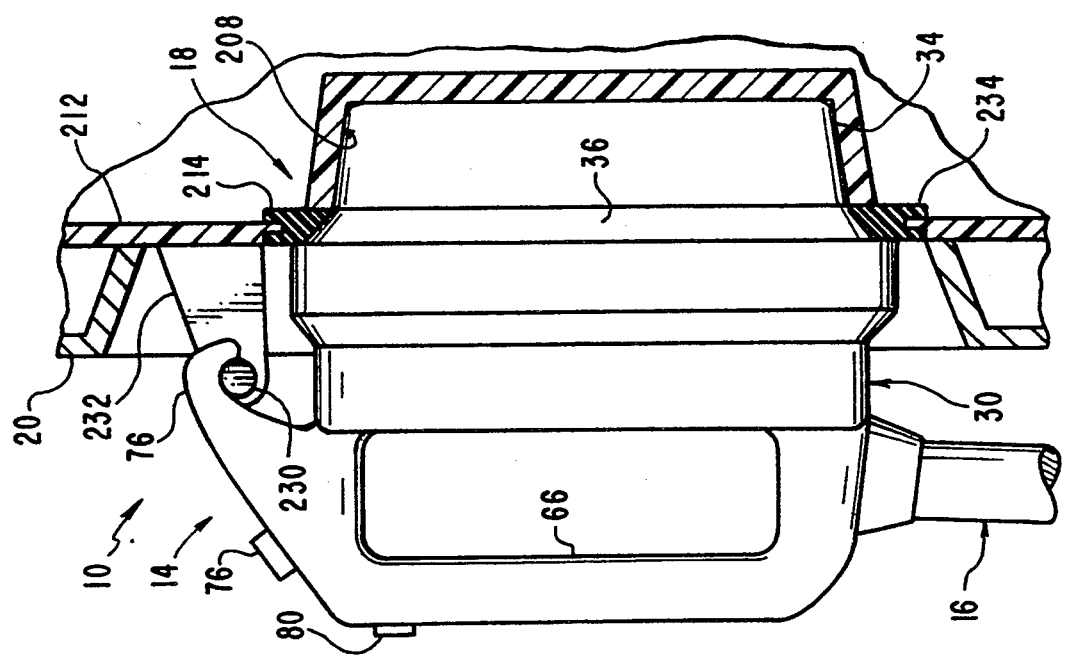
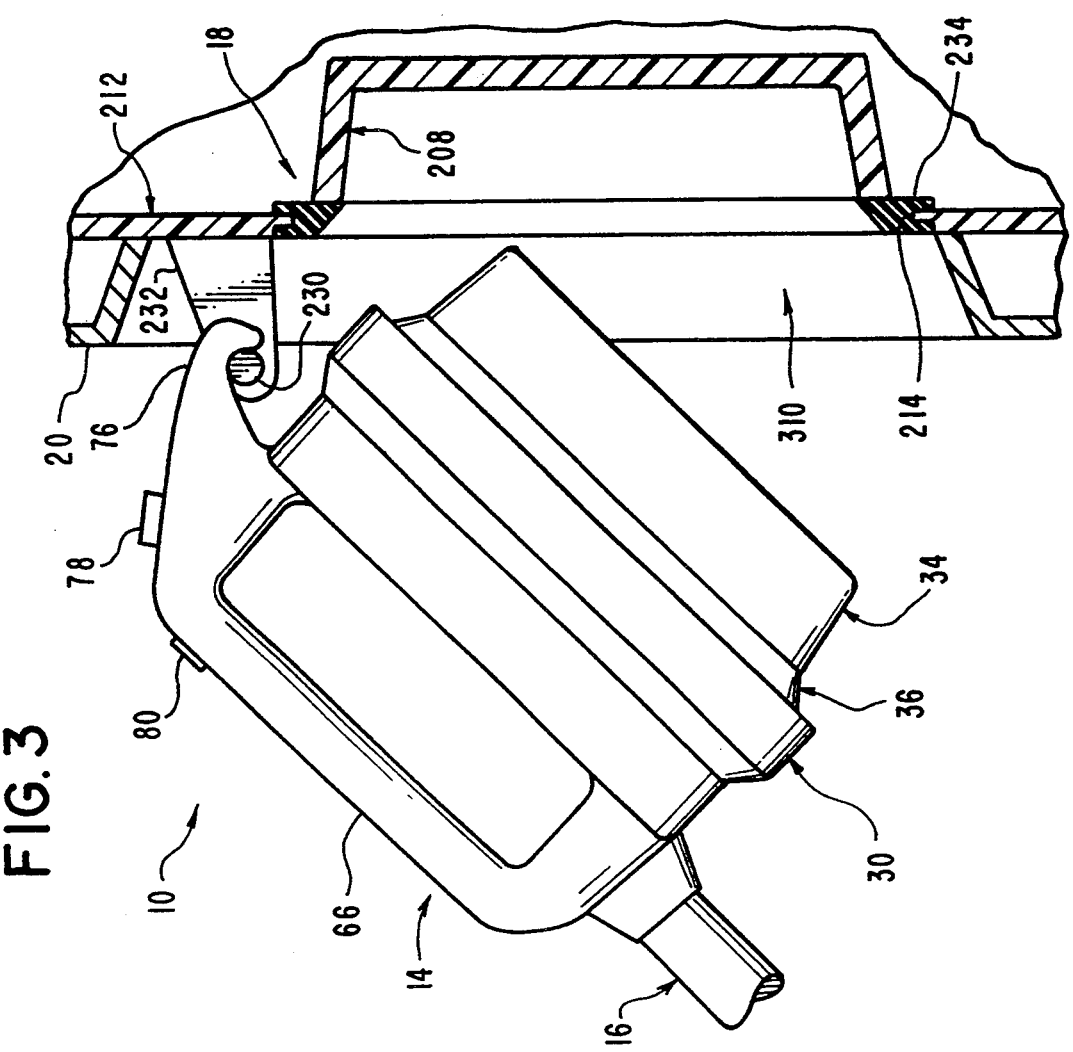

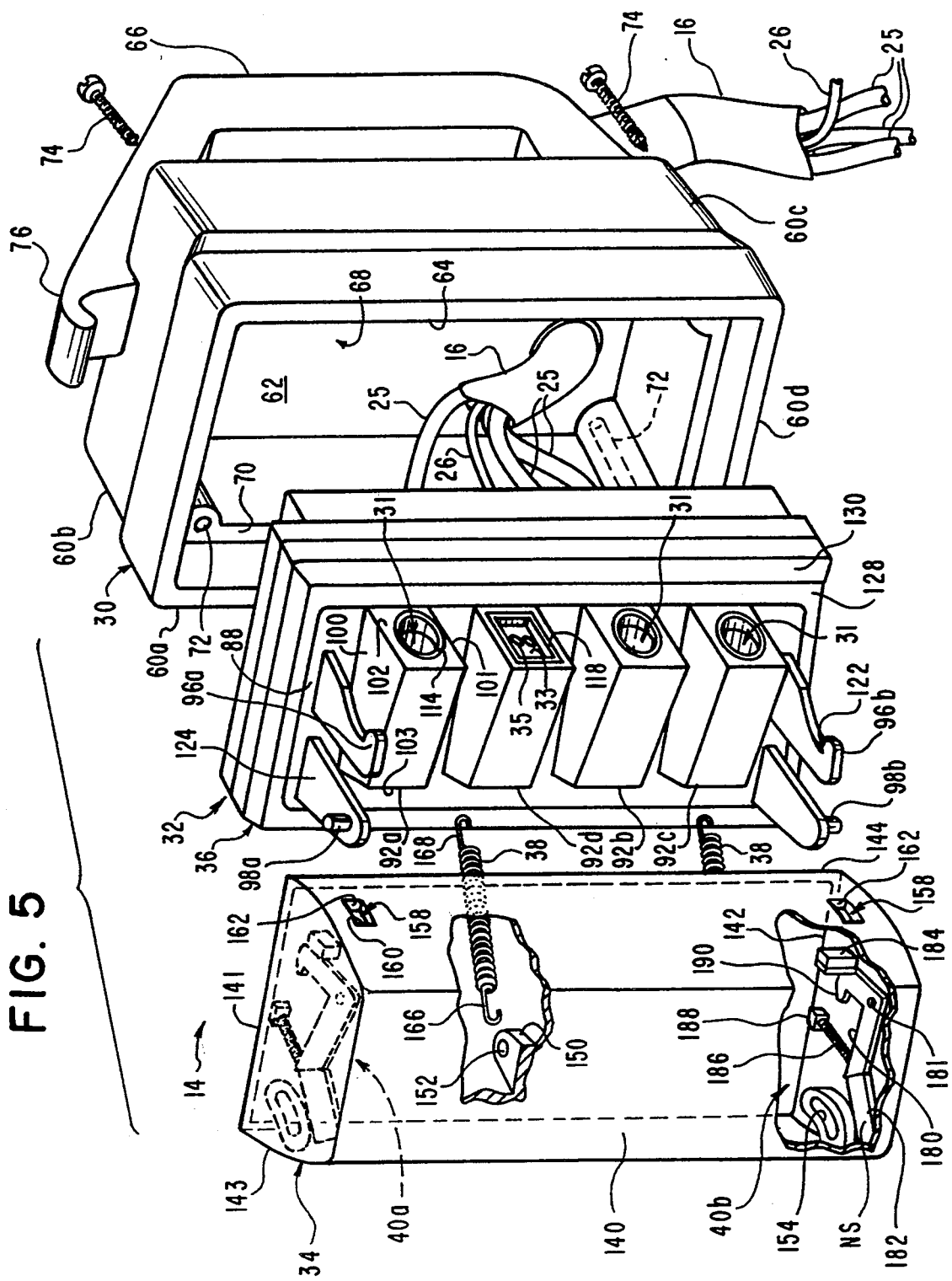

ELECTRICAL CONNECTOR ASSEMBLY, ESPECIALLY FOR ELECTRIC VEHICLE

FIELD OF THE INVENTION

This invention relates to an electrical connector assembly having a plug or male electrical connector and a receptacle or female electrical connector which mate together for electrically coupling a first set of contacts in the plug with a set of contacts in the receptacle. Specifically, the invention relates an electrical connector assembly, especially for electric vehicles, in which the electrical contacts of the plug and the receptacle are completely covered or concealed from the user until after insertion of the plug into the receptacle. The plug can be inserted into the receptacle with little or no force.

BACKGROUND OF THE INVENTION

The number of automobiles being operated is continuing to increase which has significantly increases the worldwide air pollution problem. This air pollution problem from automobiles has prompted many countries to regulate the exhaust emissions from automobiles. In fact, the exhaust emissions standards are constantly becoming stricter each year. For example, California regulators have recently passed a law requiring 2% of all vehicles sold in California to be "zero-emissions" or electric powered by 1998. Failure to meet the new emission standard would result in significant fines to automobile manufacturers selling automobiles in California. Accordingly, automobile manufacturers' ability to sell automobiles in California will be hurt if they do not produce an automobile with zero-emissions.

In view of these increasingly stricter emission requirements, automobile manufacturers are beginning to develop electric powered vehicles. Accordingly, it will be necessary to provide the owners of the electric vehicles with a safe and easy way of recharging their batteries. Moreover, electric vehicles have a limited range of travel before requiring their batteries to be recharged. Thus, recharging stations will be needed which are conveniently located and easy to operate in substantially the same manner in which gas stations are currently available for gas powered vehicles.

One example of an electric vehicle and a recharging station for recharging the batteries of electric vehicles is disclosed in U.S. Pat. No. 4,158,802 to Rose, II. The electric vehicle and the recharging station disclosed in the patent issued to Rose, II have many drawbacks. For instance, the contact surface of the vehicle is exposed to the environment which can cause the electrical contact surfaces of the vehicle to corrode. Also, the electrical contact surfaces of the vehicle and the recharging station are exposed to the driver such that the driver of the vehicle could accidentally touch one of the electric contacts and receive an electrical shock. Furthermore, this recharging station would require all electric vehicles to be manufactured within a certain range of sizes and shapes.

In view of the above, it is apparent that there exists a need for an electrical connector assembly for electric vehicles and for electrical recharging stations which will overcome the above problems of the prior art, and which are safe and convenient to operate. This invention addresses this need in the art along with other needs which will become apparent to those skilled in the art once given this disclosure.

SUMMARY OF THE INVENTION

Accordingly, a primary object of the present invention is to provide an electrical connector assembly, especially for electric vehicles, which is safe and convenient to operate.

Another object of the present invention is to provide an electrical connector having its contacts covered or concealed from the user to avoid accidental contact by the user.

Another object of the present invention is to provide an electrical connector assembly having a plug which can be inserted into a receptacle with little or no force.

Another object of the present invention is to provide an electrical connector assembly having a plug with a first set of contacts and a receptacle with a second set of contacts in which both sets of contacts remain covered until after full insertion of the plug into the receptacle.

Still another object of the present invention is to provide a weather-tight electrical connector assembly.

Yet another object of the present invention is to provide an electrical connector assembly in which the contacts of the plug and the contacts of the receptacle move in a direction transverse to the direction of insertion of the plug into the receptacle.

A further object of the present invention is to provide an electrical connector assembly having one electrical connector coupled to a recharging station and another electrical connector coupled to an electric car in which the plug and the receptacle will disengage from each other without damage thereto when an excessively high force is applied to the cable of the plug.

Another object is to provide electrical connectors which are relatively inexpensive and simple to manufacture.

The foregoing objects are basically attained by providing an electrical connector assembly, the combination comprising: a receptacle; a first electrical contact member coupled to the receptacle; a plug; second electrical contact member coupled to the plug; a first cover coupled to the receptacle for selectively covering the first contact member; second cover coupled to the plug for selectively covering the second contact member; and control members coupled to the receptacle, for selectively moving the first and second covers to uncover the first and second contact members respectively to permit electrical coupling of the first contact member with the second contact member, upon insertion of the plug into the receptacle.

Other objects, advantages and salient features of the invention will become apparent from the following detailed description, which, taken in conjunction with the annexed drawings, discloses two preferred embodiments of the invention.

BRIEF DESCRIPTION OF THE DRAWINGS

Referring to the drawings which form a part of the original disclosure:

FIG. 3 is a partial elevational view of a male electrical connector or plug just prior to full insertion into a receptacle which is shown in partial cross section with certain parts removed for clarity;

FIG. 4 is a partial elevational view of the male electrical connector of FIG. 3 just after full insertion into the receptacle which is shown in partial cross section with certain parts removed for clarity;

FIG. 5 is a partially exploded perspective view of the male electrical connector or plug illustrated in FIGS. 3 and 4 in accordance with the present invention;

DETAILED DESCRIPTION OF THE DRAWINGS

Figure 1:
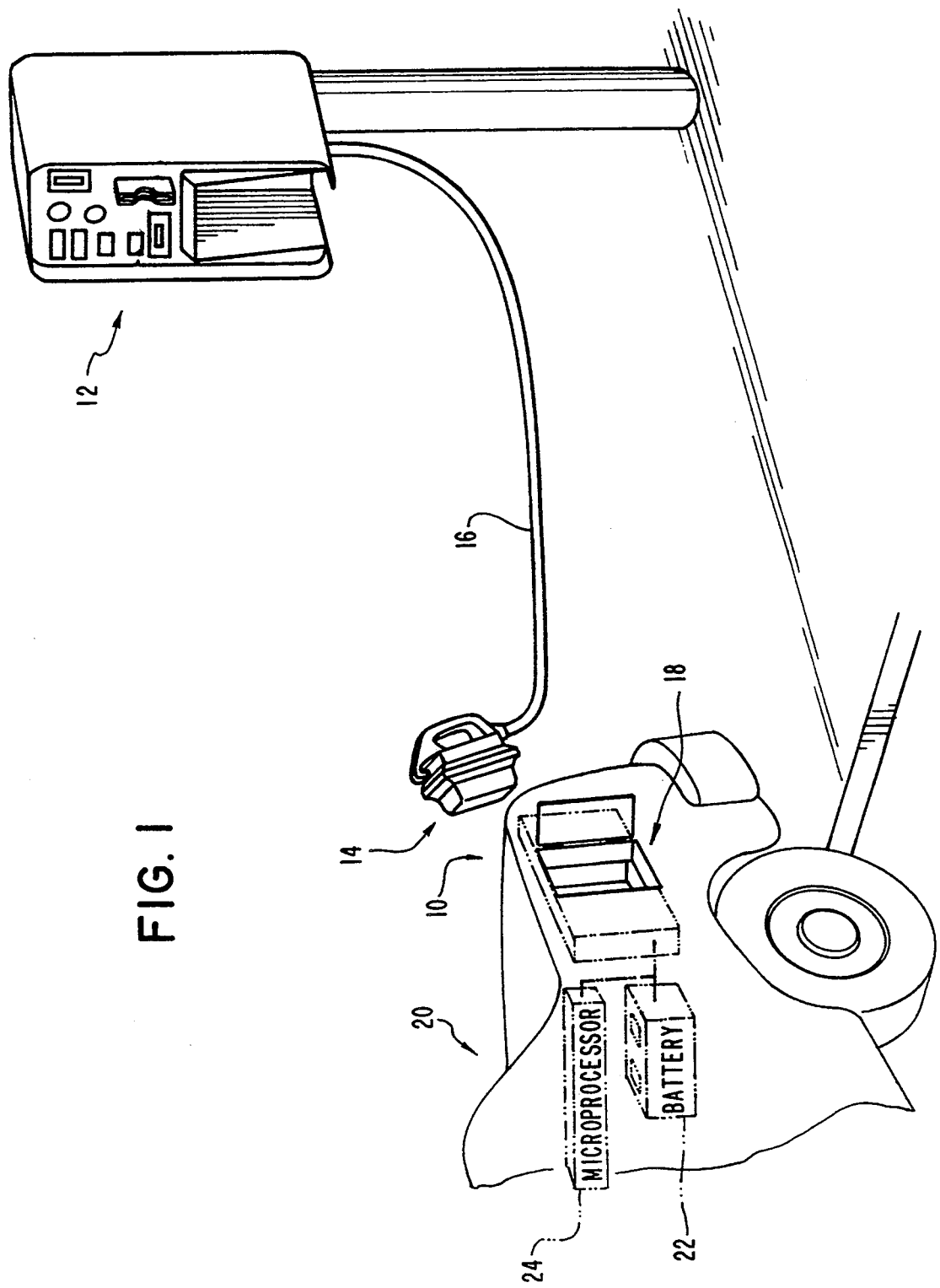
FIG. 1 is a partial, perspective view of an electrical connector assembly in accordance with the present invention and illustrated in connection with an electric vehicle and an electric recharging station.

Referring initially to FIGS. 1–4, an electrical connector assembly 10 especially designed for use with an electric car or vehicle 20 is illustrated in accordance with the present invention, and includes a power source or charging station 12 for dispensing electrical energy, a plug or male electrical connector 14 electrically coupled to power source 12 by an electrical and communication cable 16, a receptacle or female electrical connector 18 mounted in electric vehicle 20 for receiving electrical energy from plug 14, a battery 22 located in vehicle 20 and electrically coupled to receptacle 18 for receiving electrical energy therefrom, and an on-board microprocessor or computer 24 located in vehicle 20 for transmitting and receiving relevant data to and from power source 12 and to and from receptacle 18 to control the operation thereof.

While plug 14 and receptacle 18 are illustrated in conjunction with an electric vehicle 20, it will become apparent from this disclosure that plug 14 and receptacle 18 can be used in many other electrical systems and applications.

Power source or charging station 12 is preferably connected to the local electrical utility company's power line or to any other conventional source of electrical energy. Charging station 12 can be mounted in practical any location, including residential houses, apartment buildings, gas stations, parking garages, or even at the side of a curb so that power can be readily available to vehicle 20.

In residential applications, charging station 12 can be electrically connected in a conventional manner to a circuit breaker panel or power meter in residential home or apartment. Electrical connections, breaker panel, and/or power meter are all conventional and well known, and thus they will not be discussed or illustrated in detail herein.

In commercial applications, charging station 12 can be constructed to use similar electronics as used in today's automated gas stations. For example, charging station 12 can be provided with a conventional power meter for determining the amount of electrical energy dispensed, a credit or debit card slot for payment of the dispensed electrical energy, and any other of the similar type of conveniences provided at automated gas stations. The electronics and circuits which can be used for operating charging station 12 in commercial applications are conventional and well known, i.e., similar electrical circuits are currently used to operate gas station pumps, and thus the electronics and circuits for charging station 12 will not be discussed or illustrated in detail herein.

Likewise, electric vehicle 20 with battery 22 and microprocessor 24 are all conventional and well known, and thus they will not be discussed or illustrated in detail.

As seen in FIG. 5, cable 16 preferably includes three electrical power conductors 25 and a communication wire 26. Power conductors 25 are all substantially identical to each other, except that one of the conductors 25 is a ground, and the other two conductors 25 are current carrying-conductors.

Each conductors 25 is a conventional conductor with a conductive core and an insulating sheath covering the core. Accordingly, conductors, such as conductors 25, are well known, and thus will not be discussed or illustrated in detail herein.

Figure 6:
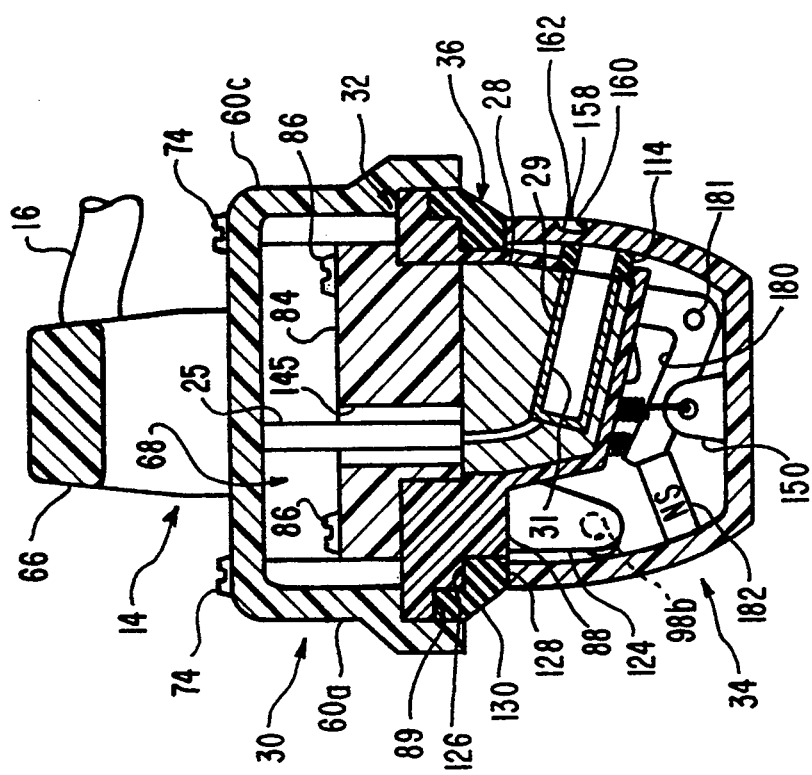
FIG. 6 is a transverse cross-sectional view of the male electrical connector or plug illustrated in FIGS. 3–5 taken along the longitudinal of the upper most contact.

As seen in FIG. 6, a terminal block 28 is fixedly coupled to the one end of each of the conductors 25, while the other end of each of conductors 25 is electrically coupled to power source 12. Each terminal block 28 has a cylindrical bore 29 with a metallic, cylindrical, tubular brush contact 31 fixedly mounted within bore 29 and electrically coupled to the core of the associated conductor 25.

Communication wire 26 is a conventional communication wire, and thus will not be discussed or illustrated in detail herein. Communication wire 26 preferably includes a plurality of insulated conductors which are each connected at one end to the electronic circuitry of power source 12 and at the other end to a contacts 35 contained in a communication connector 33. Communication connector 33 is a conventional connector with conventional electrical contacts 35 electrically connected to each of the insulated communication wires. Accordingly, communication connector 33 as well as its contacts 35 will not be illustrated or discussed in detail herein.

As seen in FIGS. 5 and 6, plug 14 is coupled to the end of cable 16 for housing the contacts 31 of the conductors 25 of cable 16, and for selectively covering and exposing the contacts 31 of the conductors 25 of cable 16. Plug 14 includes an insulated housing 30 coupled to one end of cable 16 in a water-tight manner, a contact retainer body 32 for housing terminal blocks 28 and communication connector 33, a contact cover 34 movably coupled to retainer body 32 for selectively covering and exposing the contact of the conductors of cable 16, a molded elastomeric gasket 36, a pair of tension springs 38 for coupling cover 34 to retainer body 32, and a pair of latching assemblies 40a and 40b for selectively locking an unlocking cover 34 to retainer body 32.

As seen in FIG. 5, housing 30 of plug 14 has four side walls 60a–60d rigidly coupled together, a rear wall 62, an open front face 64 for receiving retainer body 32 therein, and a handle 66 rigidly coupled to rear wall 62. Preferably, housing 30 is molded as an integral, one-piece, unitary member from a hard, rigid non-conductive material such as plastic.

Side walls 60a–60d form a substantially rectangular shaped cavity 68 with rear wall 62 when viewed in elevation. Side walls 60a–60d are stepped to form an interior annular ledge 70 along the inside surfaces of sidewalls 60a–60d. Ledge 70 limits inward movement of retainer body 32 into cavity 68, and has four bores 72 (only two shown) extending therethrough for receiving mounting screws 74 (only two shown) to couple retainer body 32 to housing 30.

As seen in FIGS. 3 and 4, handle 66 is provided with a hook 76 for engaging a portion of receptacle 18 and for holding plug 14 relative to receptacle 18, as discussed below. Handle 66 can also optionally include a charge light 78 for indicating electricity being transmitted therethrough, and a release switch 80 for disconnecting plug 14 from receptacle 18. Charge light 78 and release switch 80 are electrically coupled to conductors 25 and communication wire 26 and controlled by microcomputer 24 and/or the circuitry of power source 12 in a conventional manner with conventional circuitry. Accordingly, the details of charge light 78 and release switch 80 will not be discussed or illustrated in detail herein.

As seen in FIGS. 6–9, retainer body 32 houses terminal blocks 28 and communication connector 33, and includes a first half or member 82 and a second half or member 84 releasably coupled together by a pair of screws 86. Both first and second members 82 and 84 are constructed of an insulated, non-conductive material such as a hard rigid plastic. Preferably, first and second members 82 and 84 are each molded as a separate integral, one-piece, unitary member.

Figure 8:
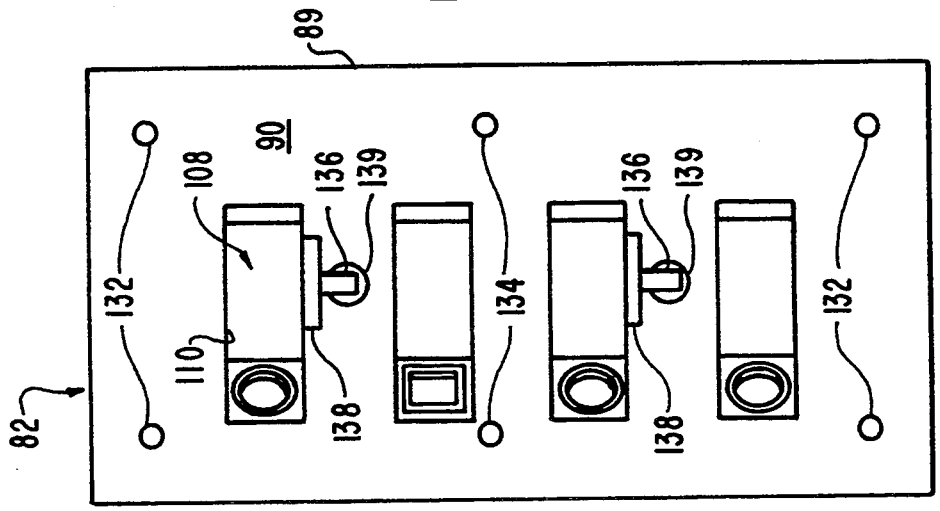
FIG. 8 is a rear elevational view of the first half of the retainer body illustrated in FIGS. 3–7.
Figure 7:
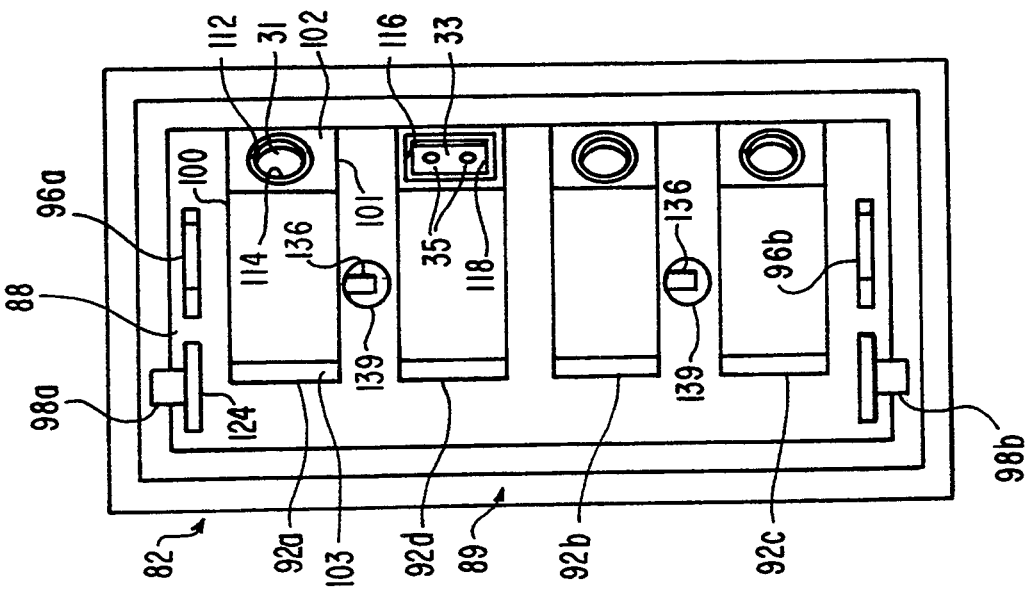
FIG. 7 is a front elevational view of the first half of the retainer body illustrated in FIGS. 3–6.

As seen in FIGS. 7 and 8, first member 82 is substantially rectangular in elevational view, and includes a rectangular exterior surface 88 facing cover 34, a stepped side surface 89, and a rectangular interior surface 90 facing second member 84.

Exterior surface 88 has three molded contact housings 92a–92c for receiving terminal blocks 28 therein, a molded communication housing 92d for receiving communication connector 33, a pair of latching hooks 96a and 96b for selectively engaging latching assemblies 40a and 40b respectively, and a pair of pivot pins 98a and 98b for pivotally coupling cover 34 to retainer body 32.

Contact housings 92a–92c are all substantially identical, and thus only contact housing 92a will be discussed and illustrated in detail. Contact housing 92a has a planar top wall 100, a planar bottom wall 101, a first end wall 102, and a second end wall 103. Walls 100–103 form a cavity 108 with an open rectangular aperture 110 extending between exterior surface 88 and interior surface 90 for receiving one of terminal blocks 28 therein. Preferably, contact housing 92a has a substantially trapezoidal shaped top plan view with end walls 102 and 103 being angled inwardly toward each other at acute angles relative to exterior surface 88 as seen in FIGS. 5 and 6.

First end wall 102 has a circular bore 112 extending therethrough for communication with cavity 108. A circular seal 114 is fixedly secured within bore 112 of end wall 102 and extends outwardly from end wall 102 for engaging the interior surface of cover 34 as seen in FIG. 6. Seal 114 provides a second barrier against the ingress of moisture from contacting contacts 31, if moisture ingresses passed gasket 36. Seal 114 is preferably made of a resilient, elastomeric material, and has an inside diameter substantially the same size or slightly larger than the inside diameter of cylindrical brush contact 31. Accordingly, when terminal block 28 is received in contact housing 92a, walls 100–103 restrict movement of terminal block 28 to maintain terminal block 28 within cavity 108 with the longitudinal axis of brush contact 31 being maintained in alignment with the longitudinal axes of bore 112 and seal 114. Preferably, the longitudinal axis of brush contact 31 forms an acute angle with exterior surface 88.

Referring to FIGS. 5 and 6, communication housing 92d is substantially identical to contact housings 92a–92c, except that communication housing 92d has a rectangular bore 116 with a rectangular seal 118 fixedly coupled with bore 116 instead of a circular bore and a circular seal, and a cavity 120 sized to accommodate communication connector 33 instead terminal block 28. Accordingly, communication connector 33 is arranged within bore 116 so that the longitudinal axes of its contacts 35 contained therein will extend substantially parallel to the longitudinal axes of rectangular bore 116 and seal 118. Seal 118 extends outwardly from contact housing 92d for engaging the interior surface of cover 34 to provide a second barrier against the ingress of moisture from contacting contact 35, if moisture ingresses passed gasket 36.

As seen in FIG. 5, latching hooks 96a and 96b are substantially identical, and extend outwardly substantially perpendicularly from exterior surface 88. Since latching hooks 96a and 96b are substantially identical, only latching hook 96b will be discussed and illustrated in detail herein. Latching hook 96b is fixedly coupled to exterior surface 88 and extends substantially perpendicularly and outwardly therefrom with the free end of latching hook 96b having a latching surface 122 extending substantially parallel to exterior surface 88 of first member 82 of retainer body 32.

Pivot pins 98a and 98b are substantially identical, except that pivot pin 98a is a mirror image of pivot pin 98b. Accordingly, only pivot pin 98a will be discussed in detail. Pivot pin 98a is fixedly and rigidly coupled to exterior surface 88 by a flange 124 which is integrally formed with pivot pin 98a and exterior surface 88. Flange 124 extends outwardly and substantially perpendicularly from exterior surface 88, while pivot pin 98a extends upwardly and substantially perpendicularly from the free end of flange 124. Pins 98a and 98b are axially aligned to form a substantially vertical pivot axis for pivotally coupling cover 34 to retainer body 32.

As seen in FIG. 8, interior surface 90 of first member 82 has a threaded hole 132 located adjacent each of its corners for threadedly receiving screws 74 to couple retainer body 32 to housing 30, a pair of centrally located threaded holes 134 for threadedly receiving screws 86 to couple first and second member 82 and 84 together, and a pair of pins 136 coupled to interior surface 90 via flanges 138.

Pins 136 extend downwardly from flanges 138 and are aligned with bores 139 which extend between surfaces 88 and 90 of retainer body 32. Each of the bores 139 receives an end of one of springs 38 therethrough.

Figure 9:
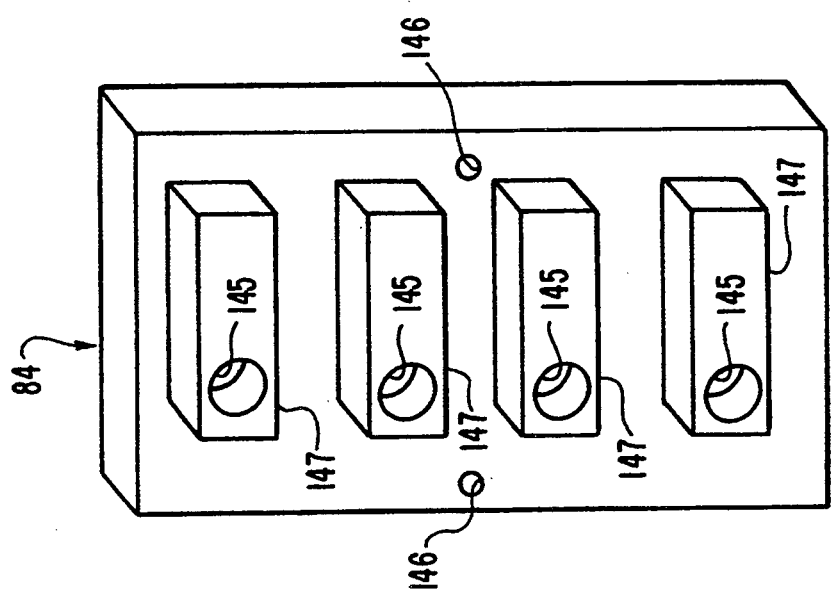
FIG. 9 is a front perspective view of the second half of the retainer body illustrated in FIGS. 3–6.

As seen in FIG. 9, second member 84 is substantially rectangular-shaped in elevational view, and has four circular openings 145 extending through second member 84, for receiving one of the conductors 25 or communication wire 26 therethrough, a pair of holes 146 for receiving screw 86 for coupling first and second members 82 and 84 of retainer body 32 together, and four rectangular-shaped protrusions 147 for engaging and maintaining one of the terminal blocks 28 or communication connector 33 in place within contact housings 92a–92d.

As seen in FIGS. 6 and 13–16, gasket 36 is constructed of a resilient, elastomeric material for creating a seal between retainer body 32 and cover 34, when cover 34 is seated against gasket 36. Also gasket 36 creates a seal between plug 14 and receptacle 18, when plug 14 and receptacle 18 are coupled together. Gasket 36 is preferably a substantially rectangular, annular ring which is fixedly coupled to retainer body 32. In particular, gasket 36 has a stepped interior surface 126 for engaging the stepped side surface 89 of retainer body 32 via a friction fit or an adhesive. Gasket 36 also includes two planar outer sealing surfaces 128 and 130. Sealing surface 128 contacts cover 34 for creating a seal therebetween, while sealing surface 130 contacts receptacle 18 for creating a seal between plug 14 and receptacle 18 when coupled together.

As seen in FIGS. 5 and 6, cover 34 of plug has a planar front wall 140, a planar top wall 141, a planar bottom wall 142, and a pair of curved side walls 143 and 144. Cover 34 is preferably constructed as an integral, unitary, one-piece member from an insulated, non-conductive material such as a relatively rigid plastic material. Walls 140–144 form a substantially rectangular trough-shaped cover. Front wall 140 has a pair of flanges 150 (only one shown) integrally molded therewith and extending substantially perpendicularly and outwardly from its interior surface. Flanges 150 each have a hole 152 therethrough for attaching one end of tension spring 38 to cover 34.

As seen in FIG. 5, top wall 141 and bottom wall 142 are substantially identical, except that they are mirror images of each other. Accordingly, only bottom wall 142 will be discussed and illustrated in detail. Bottom wall 142 has an arcuate pivot slot 154 formed adjacent a side wall 143. Slot 154 is sized to slidably and pivotally receive pivot pin 98b therein. Arcuate slot 154 allows cover 34 to pivot between a closed position covering the contacts 31 of terminal blocks 28 and the contacts 35 of communication connector 33, and an open position exposing contacts 31 of terminal blocks 28 and the contacts 35 of communication connector 33. Also, arcuate slot 154 allows for limited transverse movement of cover 34 relative to retainer body 32 as pivot pin 98b slides along slot 154. In other words, this pivotal arrangement allows a limited degree of freedom for cover 34 to find its own seating against gasket 36.

As seen in FIGS. 5 and 6, side walls 143 and 144 are substantially identical, except that side wall 144 is a mirror image of side wall 143 and side wall 144 has a pair of notches 158. Notches 158 are utilized to open and close cover 34 after plug 14 is inserted into receptacle 18 as discussed below. Each of the notches 158 has a locking surface 160 and a ramping surface 162 for controlling and regulating the opening and closing of cover 34.

Referring to FIG. 5, springs 38 are preferably tension springs which are substantially identical. Each of the springs 38 includes a pair of hooks 166 and 168 at opposite ends for attachment to cover 34 and retainer body 32. Specifically, hooks 166 are attached to cover 34 via holes 152 in flanges 150. Hooks 168 extend through openings 145 and engage pins 136 of retainer body 32. In particular, springs 38 bias cover 34 against gasket 36 so that the peripheral edges of walls 141–144 seat against sealing surface 128 in its closed position to compress gasket 36 and to create a weather-tight seal between cover 34 and retainer body 32. Upon pivoting cover 34 to its open position, tension springs 38 are stretched to expose the contacts 31 of conductors 25 and the contacts 35 of communication wire 26. Springs 38 will prevent cover 34 from remaining open, unless a separating force is applied to cover 34. In other words, springs 38 bias cover 34 to its closed position for covering the contacts 31 of conductors 25 and the contacts 35 of communication wire 26.

Figure 13:
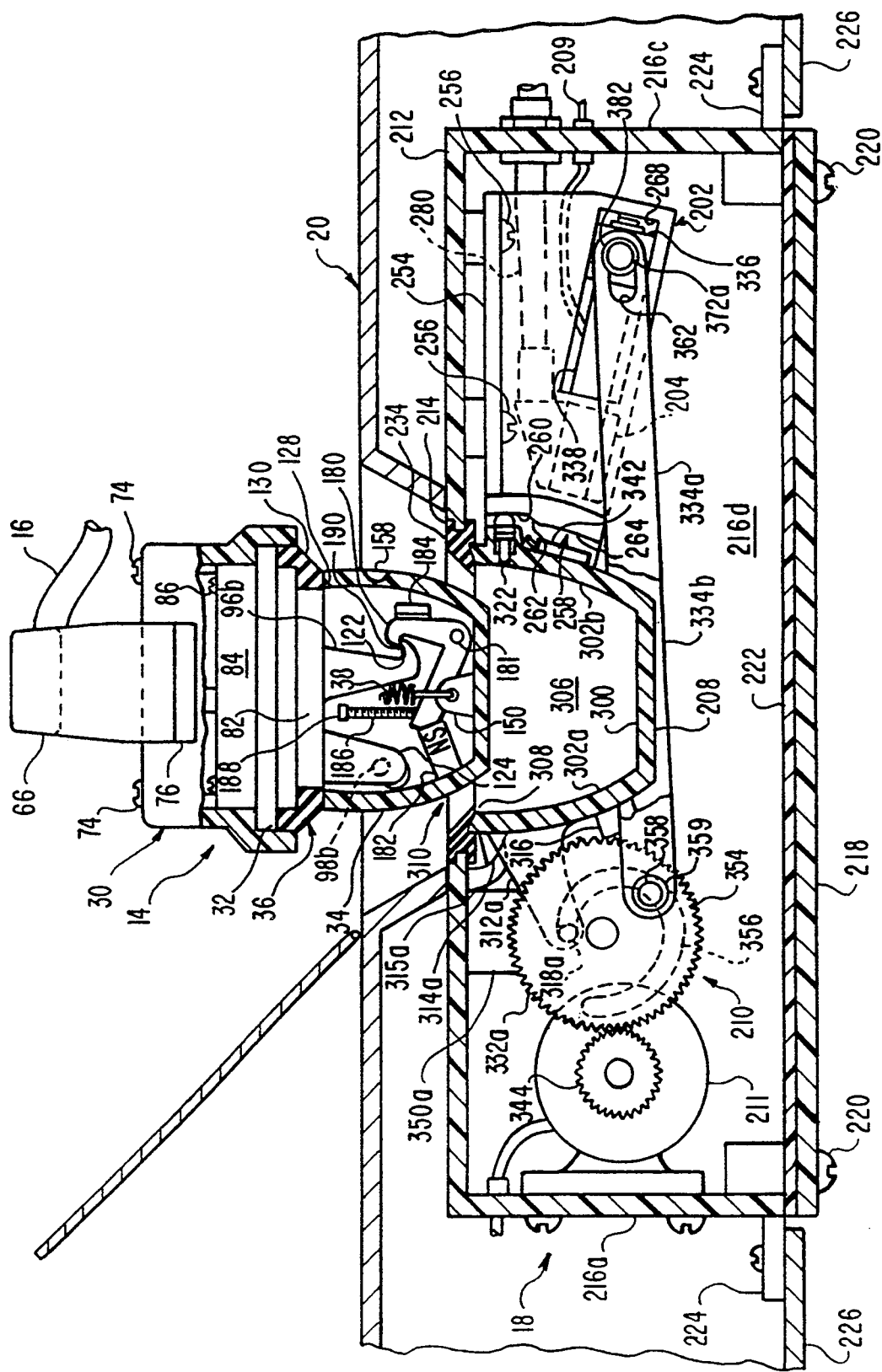
FIG. 13 is a partial top plan view of the plug just prior to full insertion into the receptacle in the vehicle with certain parts broken away for clarity.

As seen in FIGS. 5 and 13, latching assemblies 40a and 40b are substantially identical, and thus only latching assembly 40b will be discussed and illustrated in detail herein. Latching assembly 40b includes an L-shaped latch 180 pivotally coupled to bottom wall 142 by a pivot pin 181, a first magnet 182 rigidly coupled to one end of latch 180, a second magnet 184 rigidly coupled to the other end of latch 180, and a compression spring 186 coupled between an upwardly extending flange 188 of cover 34 and the end of latch 180 with first magnet 182 coupled thereto.

Spring 186 biases latch 180 about pivot pin 181 in a counter-clockwise rotation so that first magnet 182 normally abuts against the interior surface of side wall 143 of cover 34, while second magnet 184 is spaced inwardly from the interior surface of side wall 144 of cover 34. In its normal rest position, latch 180 engages hook 96b to lock cover 34 with retainer body 32. Specifically, latch 180 has a latching surface 190 which engages latching surface 122 of hook 96b of retainer body 32 to lock cover 34 in its closed position.

Referring now to FIGS. 2 and 10–16, receptacle 18 includes an outer casing 200 rigidly mounted to vehicle 20, a contact housing 202 rigidly and fixedly coupled to the interior of casing 200, three electrical power contacts 204 retained in contact housing 202, a communication connector 206 with conventional contacts 207 retained in contact housing 202, a contact cover 208 pivotally coupled to the interior of casing 200 for selectively concealing and exposing contacts 204 and contacts 207 of communication connector 206, and a contact and cover control assembly 210 for selectively moving contact cover 208 from a closed position concealing contacts 204 and 207 to an open position exposing contacts 204 and 207, and for electrically connecting the contacts 204 and 207 of receptacle 18 to the contacts 31 and 35 of plug 14.

Figure 2:
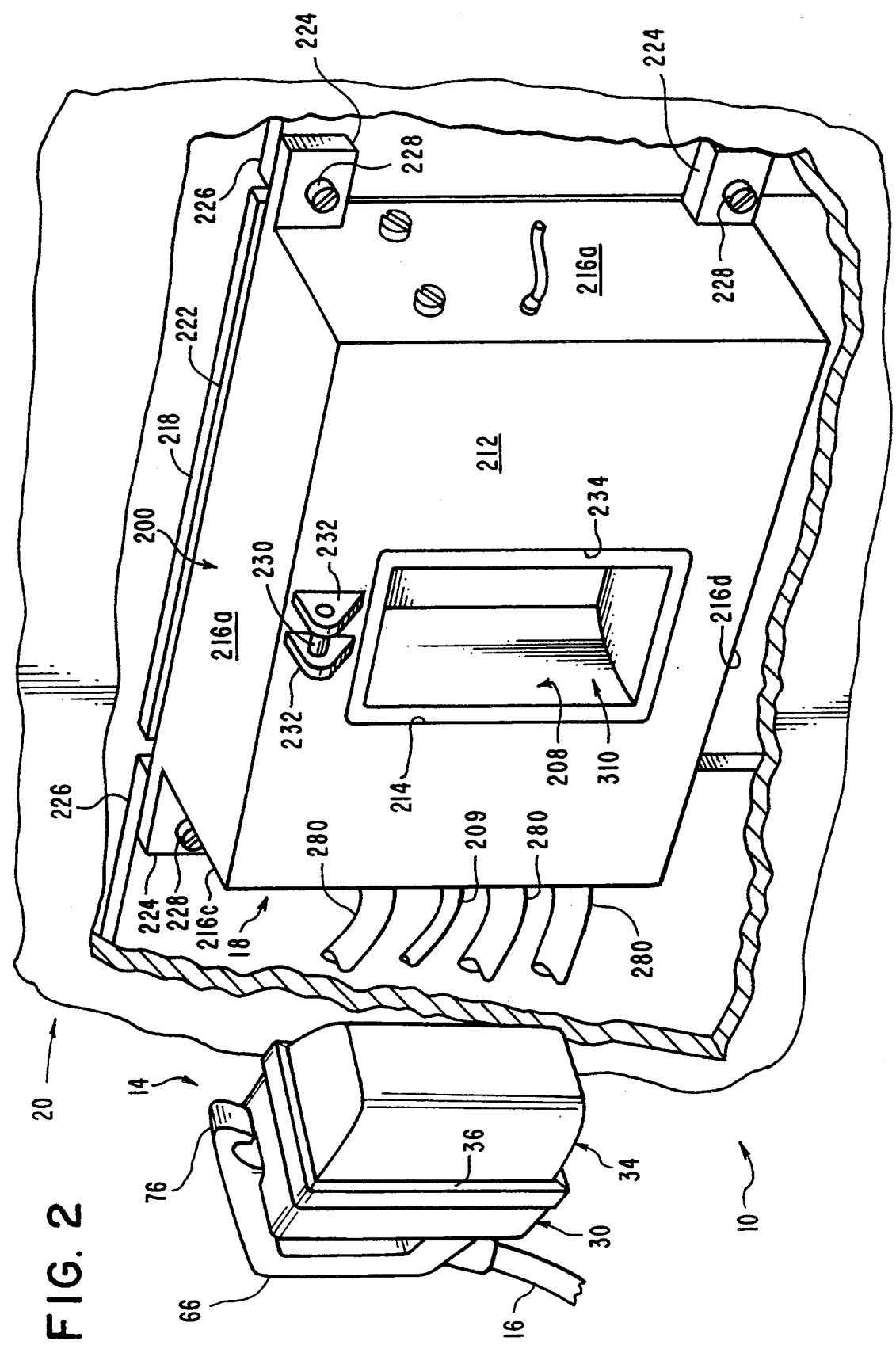
FIG. 2 is an enlarged, partial perspective view of the electrical connector assembly of FIG. 1 with certain parts broken away for clarity.

Referring to FIGS. 2 and 13, outer casing 200 is preferably constructed of an insulated, non-conductive material such as a rigid plastic, and includes a substantially planar front wall 212 with a rectangular opening 214, four substantially planar side walls 216a–216d coupled front wall 212, and a removable, substantially planar rear wall 218 releasably coupled to side walls 216a–216d via four screws 220 (only two shown). A gasket 222 is preferably positioned between the peripheral edges of side walls 216a–216d and rear wall 218 for providing a weather-tight seal therebetween. Four mounting flanges 224 extend outwardly from two opposite side walls 216a and 216c of casing 200 for rigidly mounting casing 200 to panels 226 of vehicle 20 via screws 228.

As particularly seen in FIGS. 2–4, front wall 212 has a pivot pin 230 rigidly coupled to its exterior surface above rectangular opening 214 by a pair of flanges 232 for pivotally coupling plug 14 to receptacle 18 via hook 76 of plug 14. Opening 214 of front wall 212 has an annular gasket 234 fixedly coupled thereto.

As seen in FIGS. 13–16, gasket 234 is preferably made of a suitable resilient, elastomeric material. Gasket 234 together with cover 208 seals opening 214 of casing 200 since the peripheral edges of cover 208 engages and compresses gasket 234 prior to insertion of plug 14 into receptacle 18. Accordingly, receptacle 18 is provided with a weather-tight seal between gasket 234 and cover 208. Gasket 234 also engages sealing surface 130 of gasket 36 of plug 14 to seal the interface between plug 14 and receptacle 18 after insertion of plug 14 into receptacle 18. Specifically, a positive sealing pressure is exerted between the interface of seal 36 and seal 234 by springs 38 of plug 14 when cover 34 is opened, i.e., springs 38 pull plug 14 into the cavity of cover 208. Thus, gasket 234 contacts second sealing surface 130 of gasket 36 to prevent the ingress of water and other contaminants from contacting the contacts 31 and 35 of plug 14 and contacts 204 and 207 of receptacle 18, when plug 14 is inserted into receptacle 18. Accordingly, the contacts 204 and 207 of receptacle 18 are protected from the environment at all times during normal use.

Figure 12:
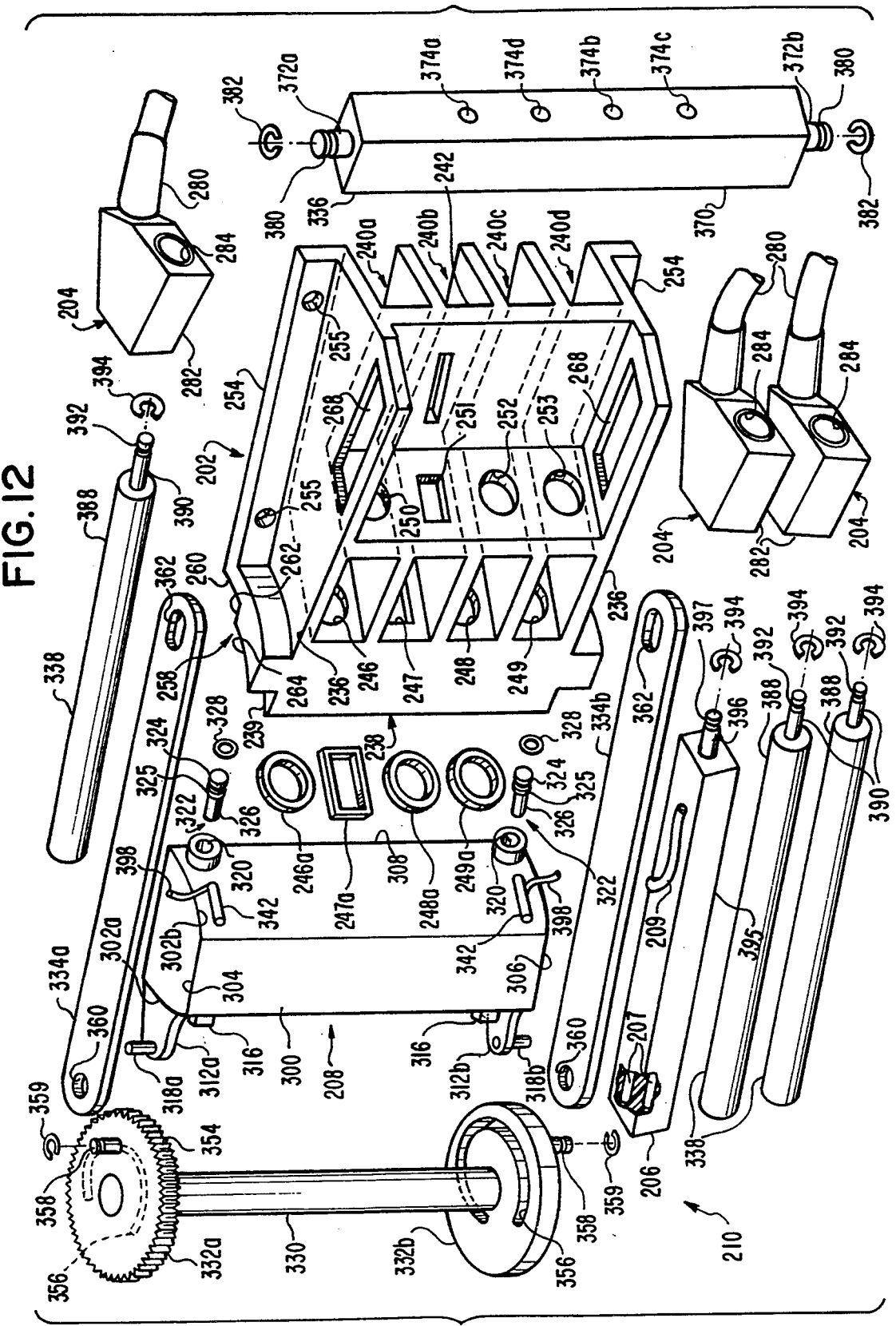
FIG. 12 is an exploded perspective view of selected parts of the receptacle illustrated in FIG. 10.

As particularly seen in FIG. 12, contact housing 202 is preferably constructed as a one-piece, integral, unitary member formed from an insulated, non-conductive material such as a rigid plastic. Contact housing 202 is substantially wedge-shaped, and includes a pair of side walls 236, a curved end portion 238 extending perpendicularly between side walls 236, and four substantially L-shaped cavities 240a–240d extending parallel to side walls 236 and equally spaced therebetween. Cavities 240a–240d are substantially identical and three of the cavities 240a, 240c and 240d receive one of the contacts 204 therein, while cavity 240b receives communication wire 209 of connector 206.

Curved end portion 238 has four bores 246, 247, 248 and 249 extending therethrough with each one of the bores 246–249 being in communication with one of the L-shaped cavities 240a–240d. Preferably, three of the four bores 246, 248 and 249 are circular in transverse cross section, while the fourth bore 247 is substantially rectangular in transverse cross section.

Figure 11:
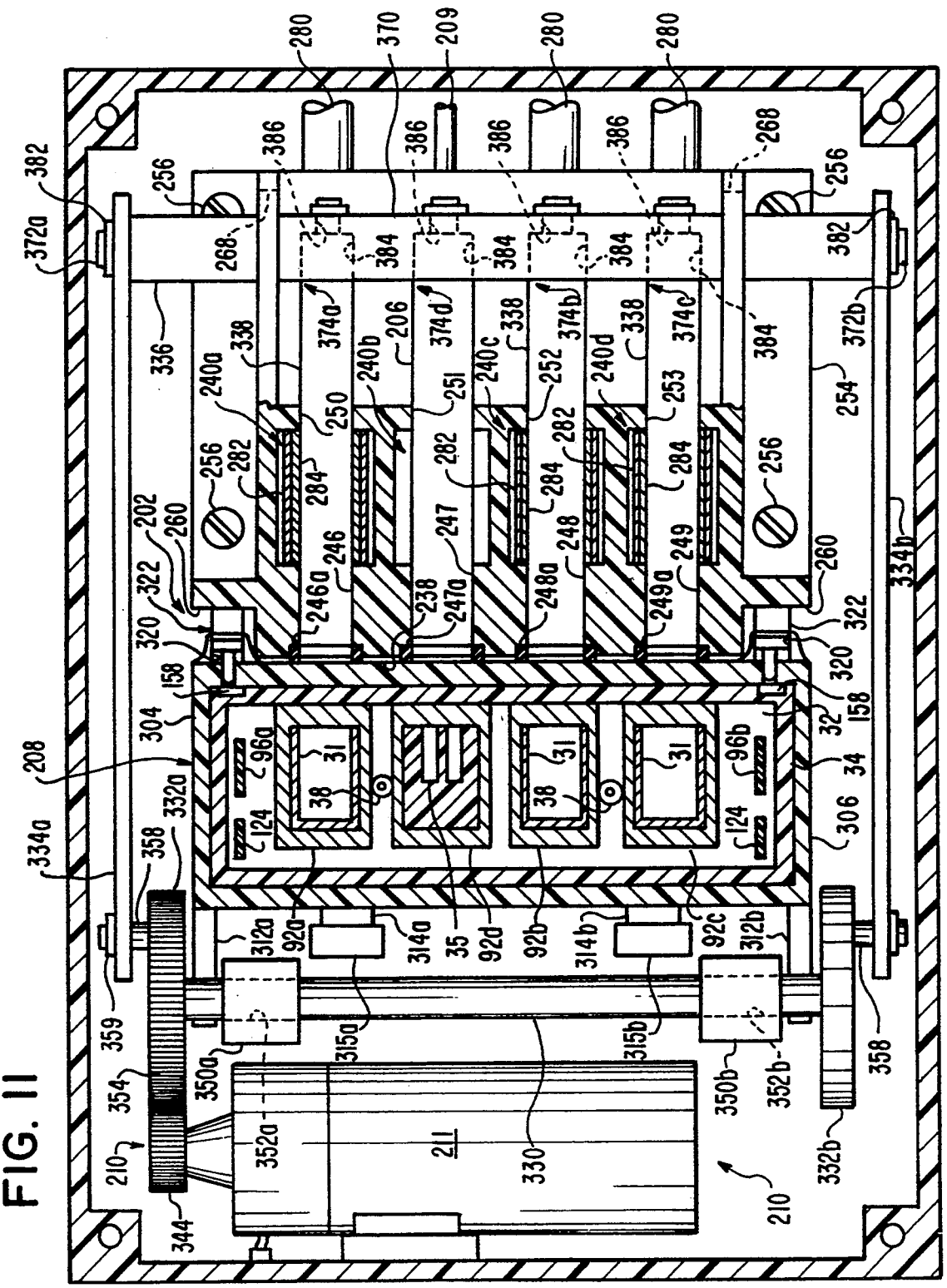
FIG. 11 is a longitudinal cross-sectional view of the receptacle illustrated in FIG. 10 with the plug inserted therein, but prior to electrical connection.

As seen in FIGS. 11 and 12, bores 246–249 are preferably stepped for receiving and retaining therein annular seals 246a–249a, respectively. Each of the seals 246a–249a engages the exterior surface of cover 208 for providing a second barrier against the ingress of moisture from contacting contacts 204 and 207. Seals 246a, 248a and 249a are all circular, while seal 247a is rectangular.

An intermediate L-shaped plate 242 extends between side walls 236 and forms a portion of each of the L-shaped cavities 240a–240d. Plate 242 has four bores 250–253 which are axially aligned with bores 246–249 respectively. Bores 250, 252 and 253 all have circular cross sections, while bore 251 has a rectangular cross section. Plate 242 also has another rectangular bore 254 extending into cavities 240b for receiving communication wire 209 therethrough.

As seen in FIGS. 12 and 13, side walls 236 each have a mounting flange 254 extending substantially perpendicularly and outwardly therefrom with a pair of mounting holes 255 for rigidly mounting contact housing 202 to the interior of front wall 212 of casing 200 via screws 256. Also, each of the side walls 236 has a cam track 258 extending outwardly therefrom and spaced inwardly from the end of curved surface 239.

Figure 14:
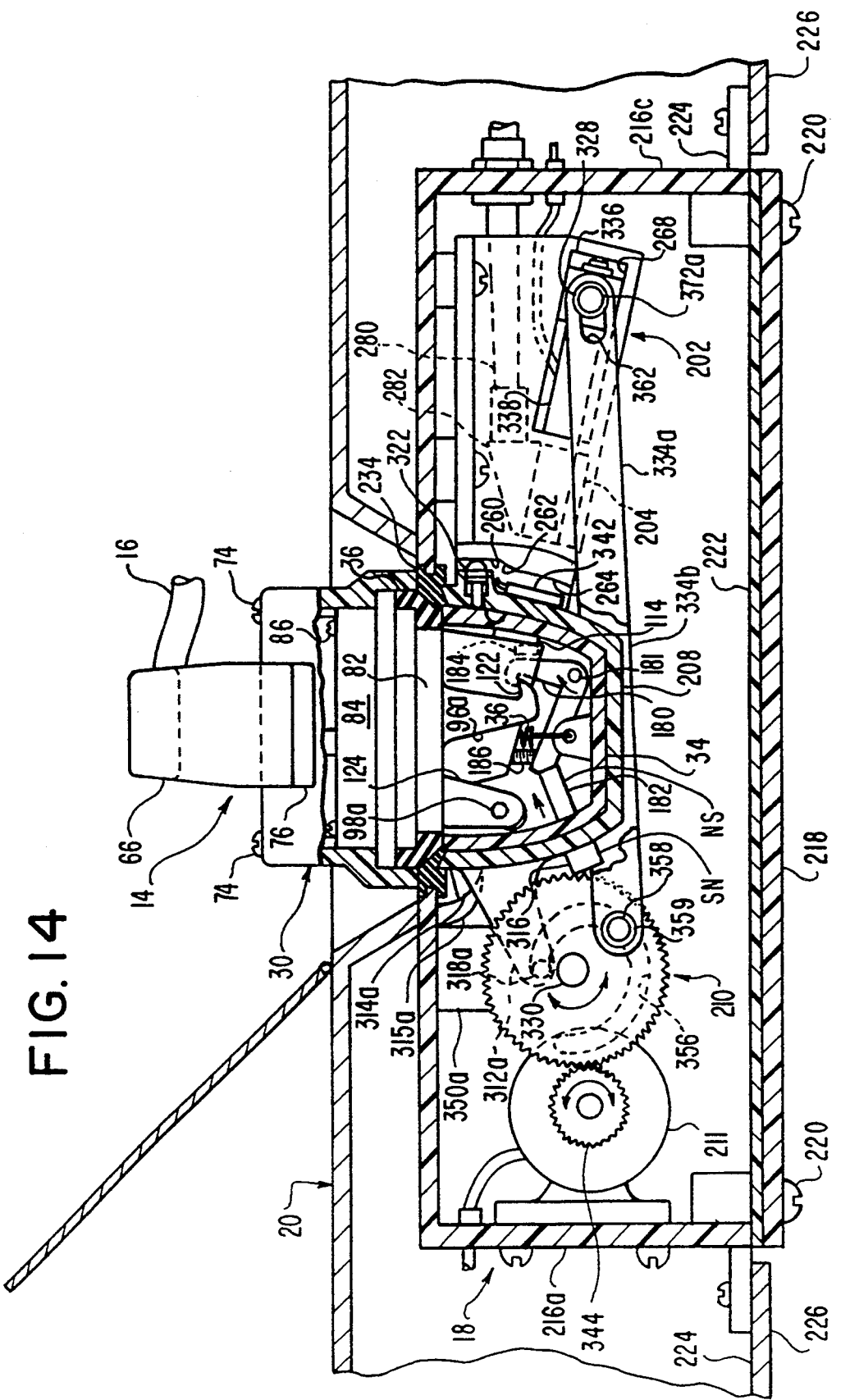
FIG. 14 is a partial, top plan view of the plug illustrated in FIGS. 3–9 just after full insertion into the receptacle in the vehicle with certain parts broken away for clarity.
Figure 15:
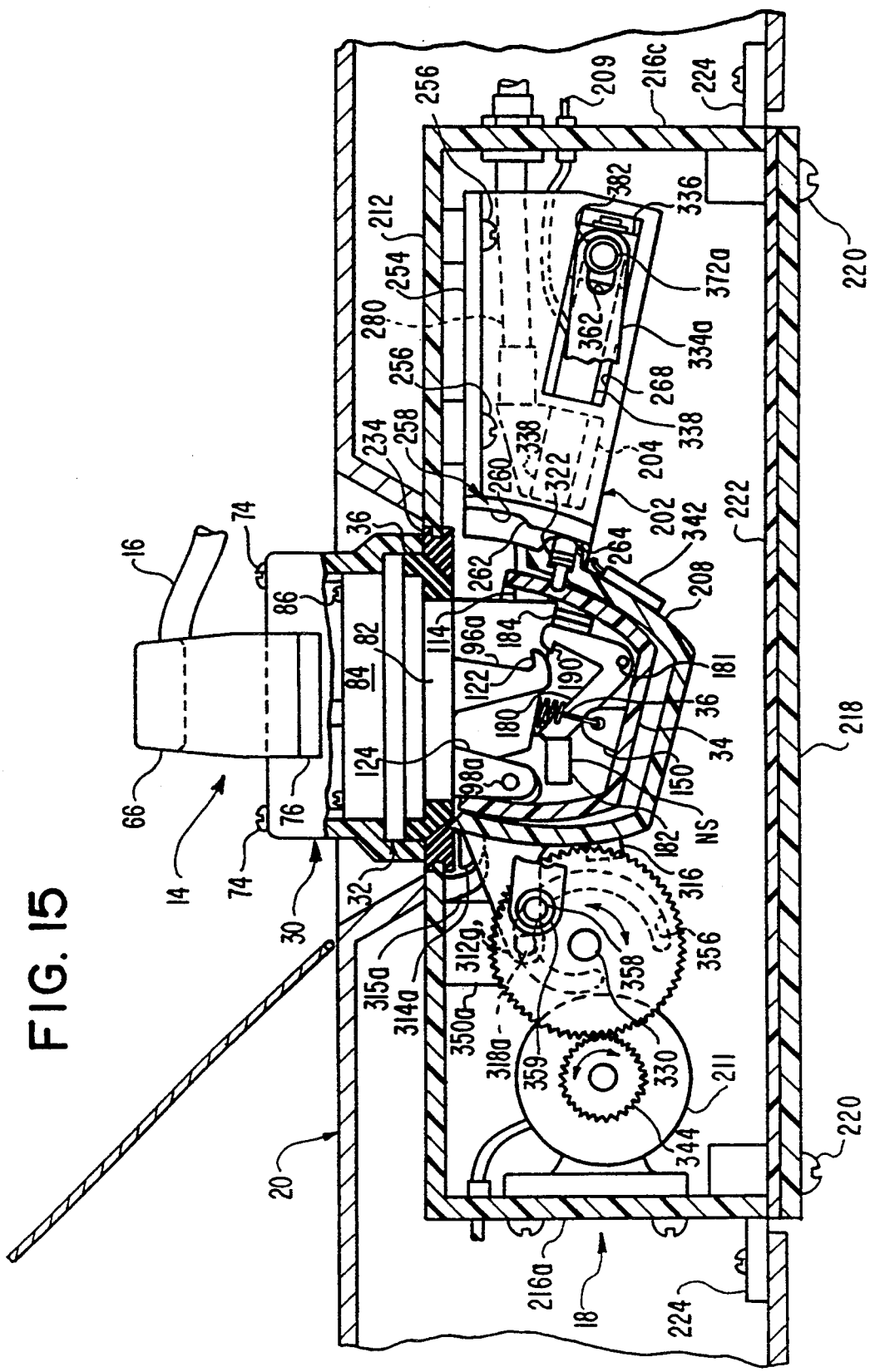
FIG. 15 is a partial, top plan view of the plug of FIGS. 13 and 14 after full insertion into the receptacle with certain parts broken away for clarity and after approximately 90° of rotation of the drive shaft from its initial position illustrated in FIG. 13.

As seen in FIGS. 13–15, cam track 258 includes a first caming surface 260, a ramp surface 262 extending from first surface 260 toward curved end portion 328, and a second cam surface 264 extending from ramp surface 262. Cam surfaces 260 and 264 have substantially identical curvatures, which are also substantially identical to the curvature of curved surface 239 of curved end portion 238. Preferably, the location of the center point for the curvatures of surfaces 260, 264 and 239 are the same.

Each of the side walls 236 also includes a rectangular guide slot 268. Guide slots 268 are vertically aligned, and have their longitudinal axes arranged substantially parallel to the longitudinal axes of bores 246–429 and bores 250–253.

As seen in FIG. 12, electrical power contacts 204 are all substantially identical, and thus only one of the contacts 204 will be illustrated in detail. Each of the electrical contacts 204 is coupled to an electrical cable 280, which in turn is coupled to the vehicle's battery 22. Each contact 204 includes a terminal block 282 fixedly coupled to cable 280 via crimping or other suitable means, and a cylindrical brush contact 284 positioned within terminal 282.

Referring to FIG. 12, communication connector 206 is a conventional connector having a plurality of conventional connector pins or contacts 207 which are electrically connected to insulated conductors contained in communication wire 209. Communication wire 209 is electrically connected to microprocessor 24 of vehicle 20. Communication connector 206 mates with communication connector 33 of plug 14 for electrically coupling the charging station 12 with microprocessor 24 of vehicle 20. Accordingly, signals and informational data is transmitted between charging station 12 and microprocessor 24 through communication wire 26, communication connectors 33 and 206, and communication wire 209 for controlling the electrical energy being dispensed from charging station 12 to battery 22 of vehicle 20.

Figure 10:
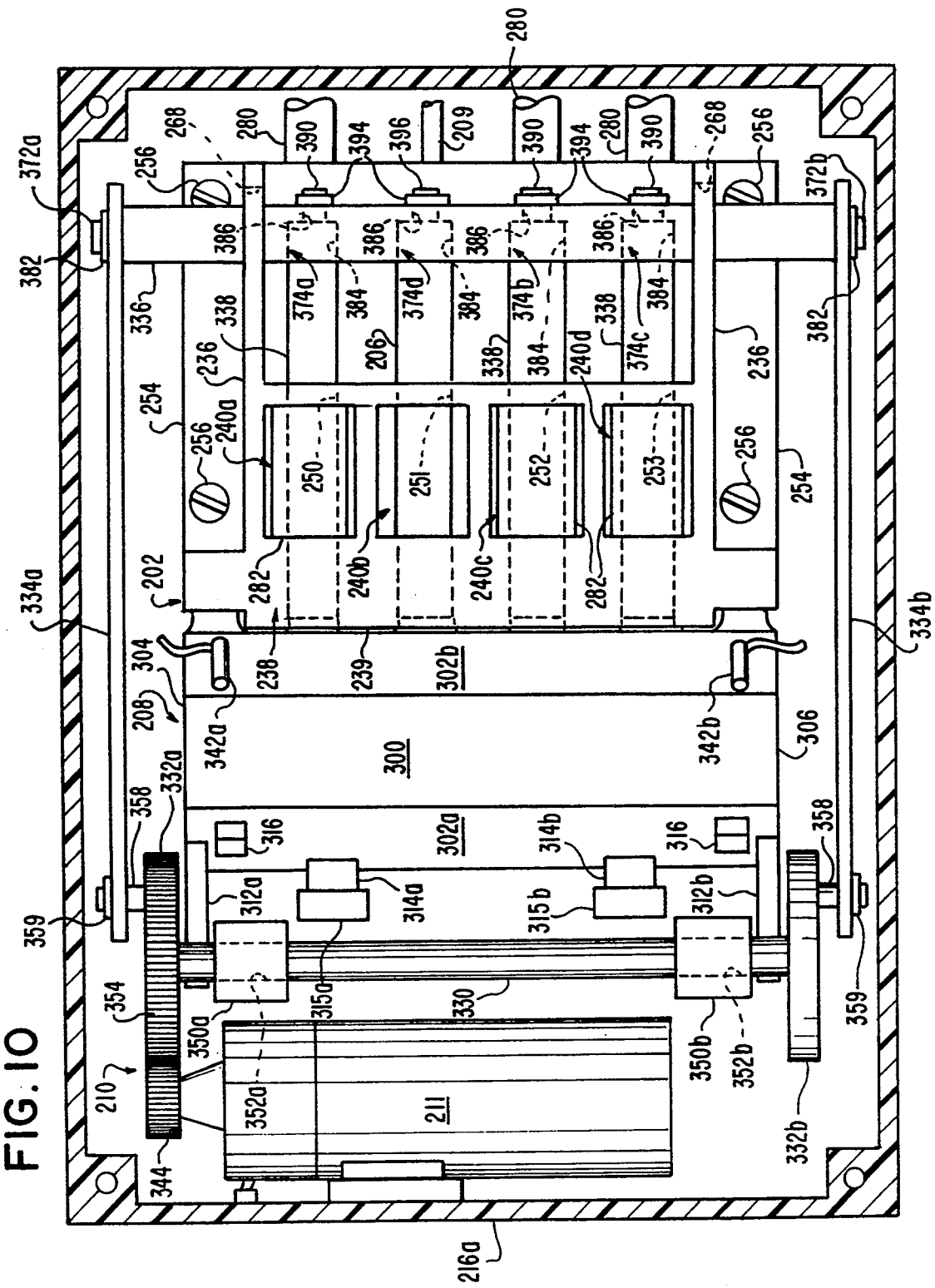
FIG. 10 is an elevational view of the receptacle in accordance with the present invention with certain parts removed for clarity.

As especially seen in FIGS. 10, 12 and 13, contact cover 208 is preferably made of an insulated, nonconductive material such as a rigid plastic. Contact cover 208 includes a planar rear wall 300, a pair of curved side walls 302a and 302b, a planar top wall 304, a planar bottom wall 306 and an open front end 308. Walls 300, 302, 304 and 306 are all integrally formed as a one-piece unitary member to form a cavity or port 310 for receiving cover 34 of plug 14 therein.

Side wall 302a has a pair of control arms 312a and 312b extending outwardly therefrom, a pair of pivot flanges 314a and 314b adjacent opening 308 of cover 208, and a pair of magnets 316.

As seen in FIG. 12, control arms 312a and 312b each include a pivot pin 318a and 318b, respectively, fixedly coupled to each of their free ends. Pivot pins 318a and 318b extends outwardly in opposite directions, and are axially and vertically aligned with each other.

Referring to FIGS. 10 and 11, pivot flanges 314a and 314b are integrally formed with side wall 302a and extend substantially perpendicularly from side wall 302a adjacent its peripheral edge which forms a portion of port 310. Flanges 314a and 314b are vertically aligned and engage a pair of flanges 315a and 315b, respectively, which are fixedly coupled to the interior surface of front wall 212 adjacent opening 214 of casing 200. Flanges 314a and 314b cooperate with flanges 315a and 315b, respectively, for controlling the pivotal movement of cover 208. Preferably the surfaces of flanges 314a and 314b which contact the surfaces of flanges 315a and 315b are curved to permit smooth pivotal movement of cover 208 relative to opening 214 of casing 200.

As seen in FIGS. 10 and 14, magnets 316 are substantially identical, conventional magnets which are fixedly coupled to side wall 302a adjacent its top wall 304 and bottom wall 306, respectively. Each of the magnets 316 has a north pole and a south pole. When plug 14 is fully inserted into receptacle 18, cover 34 of plug 14 will be received within port 310 of cover 208 of receptacle 18 so that magnets 182 of cover 34 will be positioned adjacent magnets 316. Magnets 182 and magnets 316 have opposite polarities, i.e, their north poles face each other, and thus magnets 182 and 316 repels each other when brought together.

Accordingly, when plug 14 is fully inserted into receptacle 18 as seen in FIG. 15, fixed magnets 316 of receptacle 18 due to their opposite polarity from movably magnets 182 will repel the movably magnets 182 of plug 14 causing magnets 182 to move away from magnets 316. This movement of magnets 182 will cause latches 180 to pivot about pivot pins 181 against the force of compression springs 186, until second magnets 184 of plug 14 contact side wall 302b. When plug 14 is removed from receptacle 18, compression springs 186 will pivot latches 180 back about pivot pins 181 until first magnets 182 again contacts the interior surface side wall 302a.

As seen in FIGS. 11 and 12, side wall 302b of cover 208 includes a pair of bores 320 having a pair of locking pins 322 slidably coupled therein. Bores 320 are vertically spaced with one of bores 320 being located adjacent top wall 304 and the other of bores 320 being located adjacent bottom wall 306.

Each of the locking pins 322 includes a head portion 324 and a shaft portion 326. Head portion 324 has an annular groove 325 with an elastomeric O-ring 328 retained therein. O-ring 328 has a diameter which is slightly larger than the diameter of head portion 324 and slightly larger than the diameter of bore 320 to fictionally maintain pin 322 within bore 320 at any location.

Figure 16:
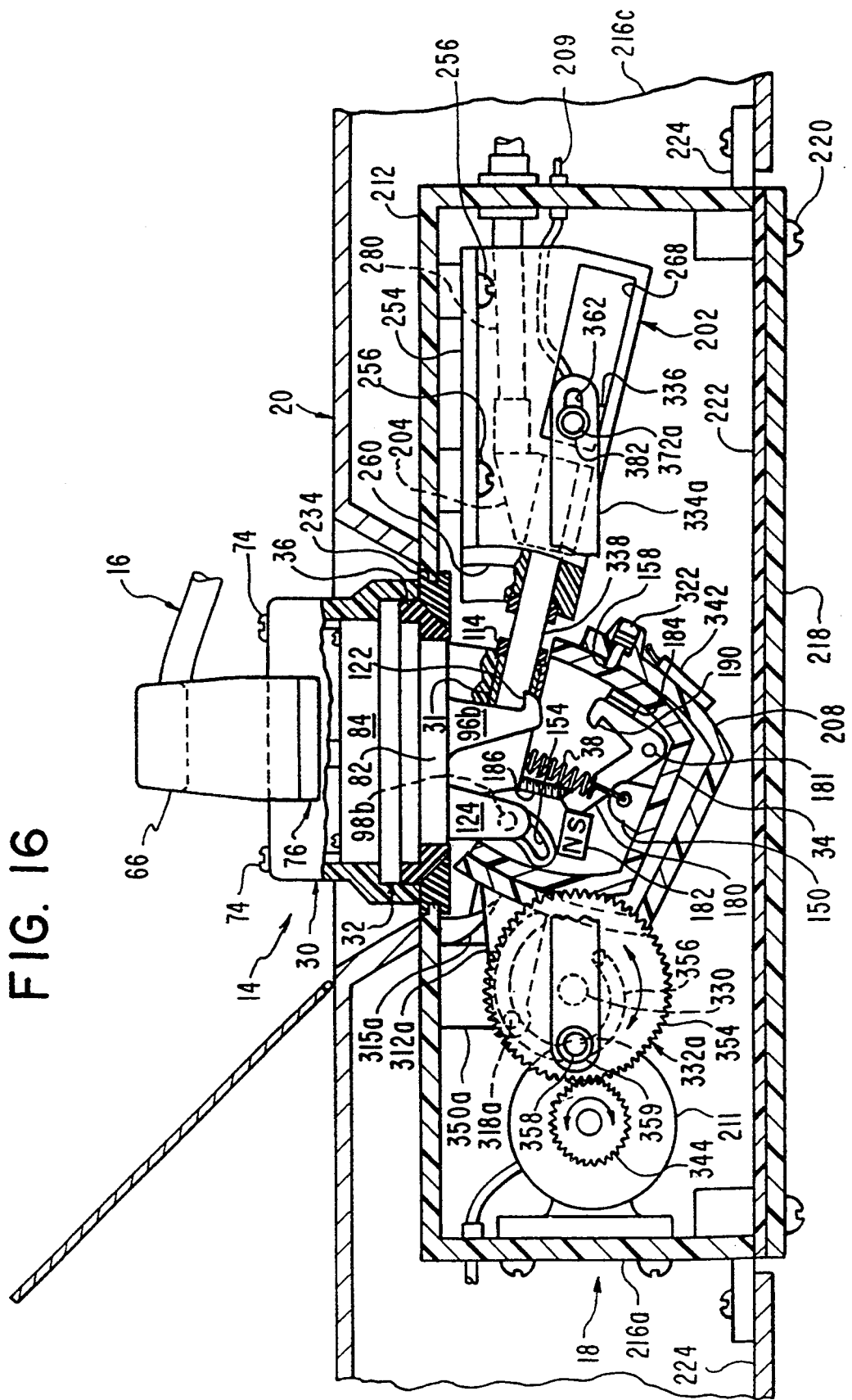
FIG. 16 is a partial, top plan view of the plug and receptacle illustrated in FIGS. 13–15 with certain parts broken away for clarity and after approximately 180° of rotation of the drive shaft from its initial position illustrated in FIG. 13.

Referring to FIGS. 14–16, locking pins 322 are slidably moved within bores 320 via cam tracks 258 and notches 158. In particular, when cover 208 is in its closed position covering opening 214 of casing 200 as seen in FIG. 14, pins 322 are in its unlocked or fully extended position for engaging first caming surfaces 260 of cam tracks 358. However, upon pivotal movement of cover 208, head portions 324 will slide along caming surfaces 260 and then engage ramps 262 which will cause pins 322 to move axially inwardly within bores 320 into notches 158 of cover 34. After head portions 324 ride over ramp surfaces 262 and begin engaging second caming surfaces 264, pins 322 are fully engaged in notches 158 of cover 34. Accordingly, cover 34 of plug 14 is now locked with cover 208 of receptacle 18.

When cover 208 and cover 34 are pivoted back from their open position exposing the contacts to their closed position covering the contacts, pins 322 will initially remain stationary within bores 320 as head portions 324 so that both cover 34 and cover 208 will move together until cover 34 engages gasket 234. Once cover 34 contacts gasket 234, cover 34 will stop moving, while cover 208 continues to move an additional distance until cover 208 engages gasket 234. As cover 208 continues to move, locking pins 322 engage ramping surface 262 to move locking pins 322 outwardly within bores 320 until head portions 324 engage first caming surfaces 260 and shaft portions 326 of pins 322 are completely disengaged from notches 158.

As seen in FIGS. 11 and 12, contact and cover control assembly 210 includes a drive shaft 330 coupled to a reversible motor 211, a pair of molded cams 332a and 332b fixedly coupled to the opposite ends of drive shaft 330, a pair of drive links 334a and 334b coupled at one of their ends to cams 332a or 332b, a molded contact bail 336 coupled to the other ends of drive links 334a and 334b, three metallic contact pins 338 coupled to bail 336, and a pair of reed switches 342 coupled to cover 208.

Motors such as motor 211 are conventional and well known in the art, and thus motor 211 will not be discussed or illustrated in detail herein. Motor 211 has a drive gear 344 rotatably coupled thereto, and is driven by motor 211 in both the clockwise and counter-clockwise directions. Motor 211 is electronically coupled to and controlled by microprocessor 24, which in turn is electrically coupled to reed switches 342 and communication connector 206.

As seen in FIG. 11, drive shaft 330 is rotatably mounted within casing 200 by a pair of bearing members 350a and 350b. Bearing members 350a and 350b are rigidly coupled, preferably molded, to front wall 212 of casing 200. Each of the bearings 350a and 350b has a bore 352a and 352b extending therethrough for rotatably receiving drive shaft 330 therein. Drive shaft 330 is preferably made of a hard rigid metallic material, and has molded cams 332a and 332b fixedly coupled at its opposite ends in a conventional manner.

As seen in FIG. 12, molded cam 332a is substantially identical to molded cam 332b, except that the outer surface of cam 332a has a plurality of gear teeth 354 which forms a gear which is driven by motor 211 via drive gear 344. Each of the cams 332a and 332b includes a spiral groove 356 on one side for receiving pivot pins 318a and 318b, respectively therein, and a drive pin 358 extending perpendicularly from the other side of the cam opposite the side with spiral groove 356. The spiral grooves 356 and drive pins 358 of cams 332a and 332b are vertically aligned. Spiral groove 356 initially rises very rapidly away from drive shaft 330 for approximately the initial 90° of rotation, and then remains constant after approximately 90° of rotation.

As seen in FIG. 12, drive links 334a and 334b are preferably constructed of a substantially rigid metallic material. Each of the drive links 334a and 334b has a circular pivot opening 360 at one end and an oblong slot 362 at its opposite end. Drive links 334a and 334b are coupled to cams 332a and 332b via drive pins 358 which are received in pivot openings 360, and secured by retaining thereto rings 359. The other ends of drive links 334a and 334b are coupled to bail 336 via slots 362.

As seen in FIGS. 11 and 12, bail 336 has a main body portion 370 with a substantially rectangular transverse cross-section, a first drive pin 372a extending outwardly and perpendicularly from one end of body 370, a second drive pin 372b extending outwardly and perpendicularly from the opposite end of body 370, and four substantially identical stepped bores 374a–374d for fixedly coupling contact pins 338 and communication connector 206 therein.

Referring to FIGS. 13–16, bail 336 is received in rectangular guide slots 268 for reciprocating motion within guide slots 268. Specifically, bail 336 is reciprocated within guide slots 268 by motor 211 which rotates cams 332a and 332b, which in turn reciprocates drive links 334a and 334b and bail 336.

Each of the drive pins 372a and 372b is received in one of the slots 362 of drive links 334a and 334b, and has an annular groove 380 for receiving a retaining ring or C-clip 382 therein to retain drive links 334a and 334b on drive pins 372a and 372b, respectively.

As seen in FIG. 10, bores 374a–374d each has a first tubular portion 384 and a second tubular portion 386. The diameter or width of second tubular portion 386 is smaller than the diameter or width of first tubular portion 384. Preferably, first and second tubular portions 384 of bores 374a–374c have a circular transverse cross-section to accommodate one end of contact pins 338 therein. The first tubular portion 384 of bore 374d, on the other hand, has a rectangular transverse cross-section to accommodate a portion of one end of communication connector 206 therein.

As seen in FIG. 12, metallic contact pins 338 are preferably made of a highly conductive metallic material, and each has a first cylindrical portion 388 with a diameter slightly smaller than the diameter of first tubular portion 384 of bore 374a–374c and a second cylindrical portion 390 with a diameter slightly smaller than second tubular portion 386 of bore 374a–374c so that one end of each of contact pins 338 is received within one of the bores 374a–374c. The small cylindrical portion 390 of each contact pin 338 has an annular groove 392 for receiving a retaining ring or C-clip 394 for fixedly each coupling pin 338 to bail 336.

As seen in FIG. 12, communication connector 206 has a substantially rectangular portion 395 which houses conventional contacts 207 and a cylindrical shaft 396 extending outwardly from one of the longitudinal ends of rectangular portion 395. Rectangular portion 395 of communication connector 206 is sized to be snugly received in first portion 384 of bore 374d, while circular portion 396 is sized to be snugly received in second portion 386 of bore 374d. Circular portion 396 has a groove 397 for receiving a retaining ring or C-clip 394 for fixedly coupling communication connector 206 to bail 336.

As seen in FIG. 12, reed switches, such as reed switch 342, are well known in the art, and thus reed switches 342 will not be discussed or illustrated in detail herein. Reed switches 342 are rigidly coupled at opposite ends of cover 208 for being activated by second magnets 184 of plug 14, upon plug 14 being inserted into port 310 of receptacle 18. Reed switches 342 are electrically connected via wires 398 to microprocessor or computer 24 which in turn activates motor 211.

Operation of Electrical Connector Assembly 10

Referring to FIGS. 13–16, plug 14 has its electrical contacts completely concealed by cover 34 prior to insertion into receptacle 18, while the contacts of receptacle 18 are completely concealed by cover 208. Thus, inadvertent contact with either the electrical contacts of plug 14 or receptacle 18 by the user is prevented, as well as, the ingress of water or contaminants.

As seen in FIGS. 3 and 4, plug 14 is inserted into receptacle 18 by first engaging hook 76 of plug 14 on pivot pin 230, and then swing plug 14 downwardly into receptacle 18 so that cover 34 of plug 14 is received in the cavity or port 310 of cover 208 of receptacle 18. Cavity 310 is sized to received cover 34 of plug 14 therein with little or no hand force by the user to insert plug 14 into receptacle 18.

When plug 14 is fully inserted into cavity 310 of cover 208, sealing surface 130 of gasket 36 contacts the sealing surface of gasket 234 to prevent water and other contaminants from entering between plug 14 and receptacle 18. Thus, the internal contacts of plug 14 and receptacle 18 are sealed from ingress of moisture, and contaminants not only when the devices are separated but also when plug 14 is inserted in receptacle 18.

Referring to FIGS. 14 and 15, when cover 34 is fully inserted into cover 208, first movable magnets 182 of plug 14 are brought into close proximity with fixed magnets 316 of receptacle 18 for unlatching cover 34. Specifically, magnets 182 and magnets 316 have opposite polarities, i.e., their north poles face each other, magnets 182 and 316 will repel each other. Since magnet 316 is fixed, magnets 182 will be repelled since it is pivotally coupled to cover 34 via latch. As seen in FIG. 15, this repulsive force rotates latches 180 about pivot pins 181 against the force of compression springs 186, until second magnets 184 of plug 14 contact side wall 302b of cover 34. In other words, as the latch 180 swings out of engagement with hooks 96a and 96b, second magnets 184 are brought into close proximity of the magnetic field of reed switches 342. Accordingly, cover 34 now can be moved relative to retainer body 32 by pivot pins 98a and 98b which are received in arcuate slots 154. This pivotal arrangement allows a limited degree of freedom for cover 34 to find its own seating against gasket 36. However, cover 34 is held in the closed position by two tension springs 38, which presses the periphery of cover 34 against the resilient gasket 36.

Reed switches 342 send a signal via wires 398 to microprocessor 24 which in turn operates motor 211. If both magnets 182 are not brought into close proximity with the magnetic fields of each of reed switches 342, motor 211 will not be activated. In other words, motor 211 will only activate if plug 14 is fully and properly seated within cover 208 of receptacle 18. Thus, this arrangement ensures that covers 34 and 208 are only opened after cover 34 is properly seated and unlatched.

The closure of reed switches 342 by magnets 182 now starts drive motor 211 which rotates cams 332a and 332b. In particular, drive gear 344 of motor 211 rotates upper cam 332a which in turn rotates lower cam 332b via drive shaft 330. As cams 332a and 332b rotate, pins 318a and 318b of cover 208 ride along spiral grooves 356 which causes cover 208 to move from its closed position to its open position. As cover 208 pivots to its open position, cover 208 grabs cover 34 of plug 14 via locking pins 322 to pivot cover 34 to its open position.

In particular, as receptacle cover 208 pivots, locking pins 332 engage cam tracks 258 which slides pins 332 into notches 158 of cover 34. Specifically, head portions 324 of pins 322 slide along caming surfaces 260 of cam tracks 258 and after a certain degree of rotation, they engage ramps 262 which will cause pins 332 to move axially inwardly within bores 320 of cover 208 and into notches 158 of cover 34. After head portions 324 ride over ramp surfaces 286 and begin engaging second caming surfaces 262, pins 322 will be fully inserted into notches 158 and engaging its locking surface 160 for coupling plug cover 34 to receptacle cover 208. Thus, further pivoting of cover 208 will also pivot cover 34, and thereby expose the contacts of plug 14 to the contacts of receptacle 18.

Also as cams 332a and 332b rotate, it pulls also drive links 334a and 334b via drive pins 358. In particular, drive pins 358 are received in pivot openings 360 of drive links 334a and 334b so that drive links 334a and 344b move along with cams 332a and 332b. The other ends of drive links 334a and 334b are connected to bail 336 via pins 372a and 372b which are received in oblong slots 362 of drive links 334a and 334b. Oblong slots 362 of drive links 334a and 334b ensure that bail 336 along with contact pins 338 and communication connector 206 does not begin reciprocating during the initial 90° of rotation of cams 334a and 334b to allow covers 34 and 208 first to be pivoted to their open positions, and thereby exposing the contacts of plug 14 and receptacle 18.

During the first 90° of rotation, cam follower pins 318a and 318b to of cover 208 in spiral grooves 356 causing cover 208 to swing open to expose the contacts of receptacle 18. Also during this first 90° of rotation, drive pins 358 drive links 334a and 334b to the right as seen in the figures, by the amount of the arcuate displacement of its circular path. The oblong slot 362 of links 334a and 334b allow the drive links 334a and 334b to be displaced during the first 90° of rotation of cams 332a and 332b without acting on or moving bail 336. However, as the cams 332a and 332b rotate past the 90° point, links 334a and 334b engage pins 372a and 372b of bail 336 for reciprocating bail 336 linearly to the left within guide slots 268 of contact housing 202 as seen in the Figures.

As the cams 332a and 332b rotate and reciprocate bail 336 via drive links 334a and 334b, it pulls contact pins 338 and communication connector 206 into contact with contacts 31 and 35 of plug 14.

When the mechanisms return covers 34 and 208 to their closed positions, the above described sequence is reversed causing the locking pins 322 to be camed back out of notches 158 by ramping surface 162 and pins 338 and 206 to be withdrawn from the contacts 31 and 35 of plug 14. In particular, when cover 208 and cover 34 are pivoted from their open position to the closed position covering the contacts of plug 14 and receptacle 18, locking pins 322 will initially remain stationary within bores 320 as head portions 324 slide back along second caming surfaces 264 so that both cover 34 and cover 208 will move together until cover 34 engages gasket 236. When cover 34 engages gasket 236, cover 34 will stop, while cover 208 will continue to close an additional distance until cover 208 engages gasket 234. As cover 208 continues to pivot, locking pin 322 moves within notches 158 to engage ramping surfaces 162 which in turn move locking pins 322 outwardly within bore 320 until head portions 324 engage first caming surfaces 260 and shaft portions 326 of pins 322 completely disengage from notches 158. At this point, plug 14 can be removed from receptacle 18.

Figure 17:
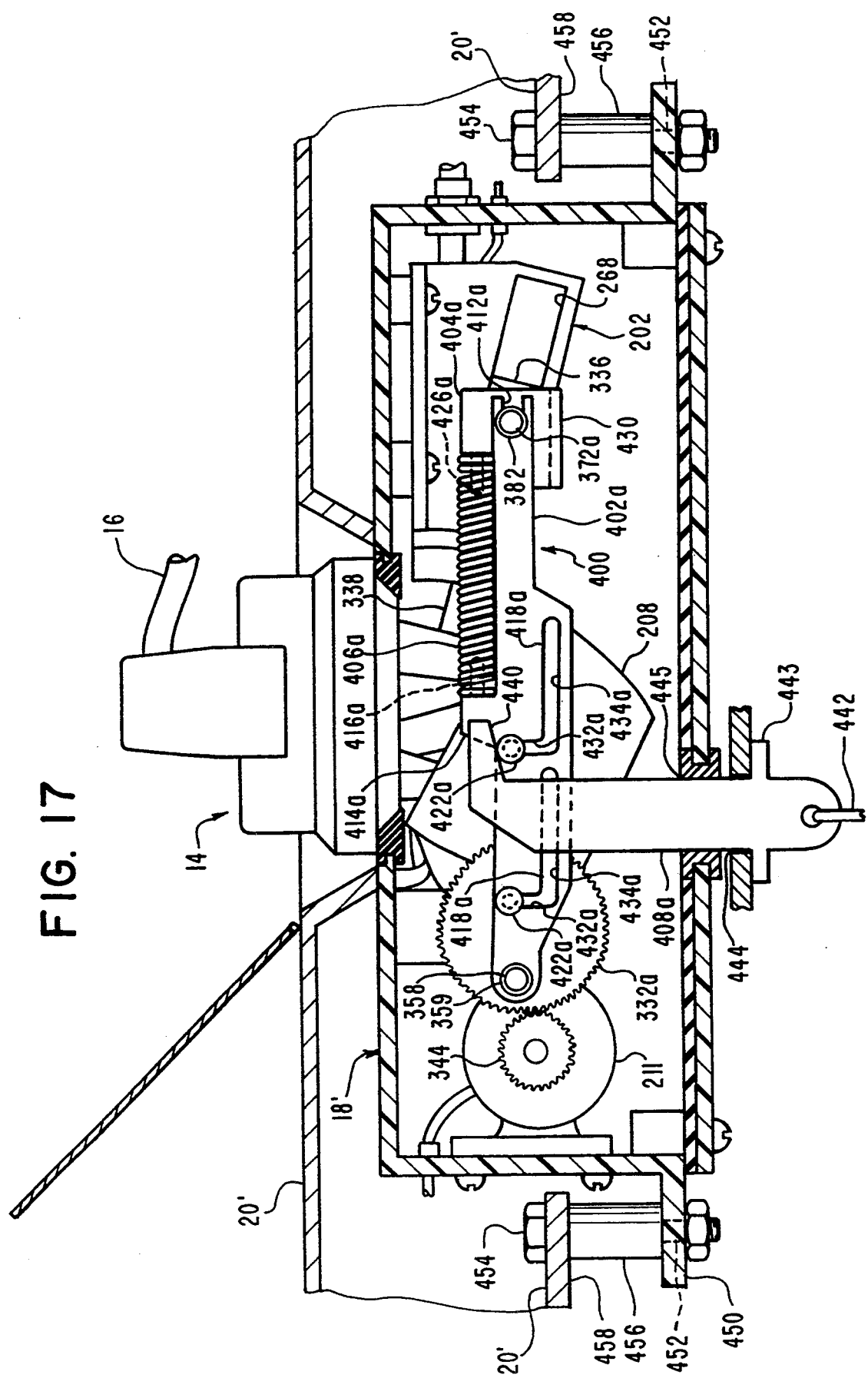
FIG. 17 is a partial top plan view of a receptacle an accordance with a second embodiment of the present invention and with certain parts broken away for clarity.
Figure 18:
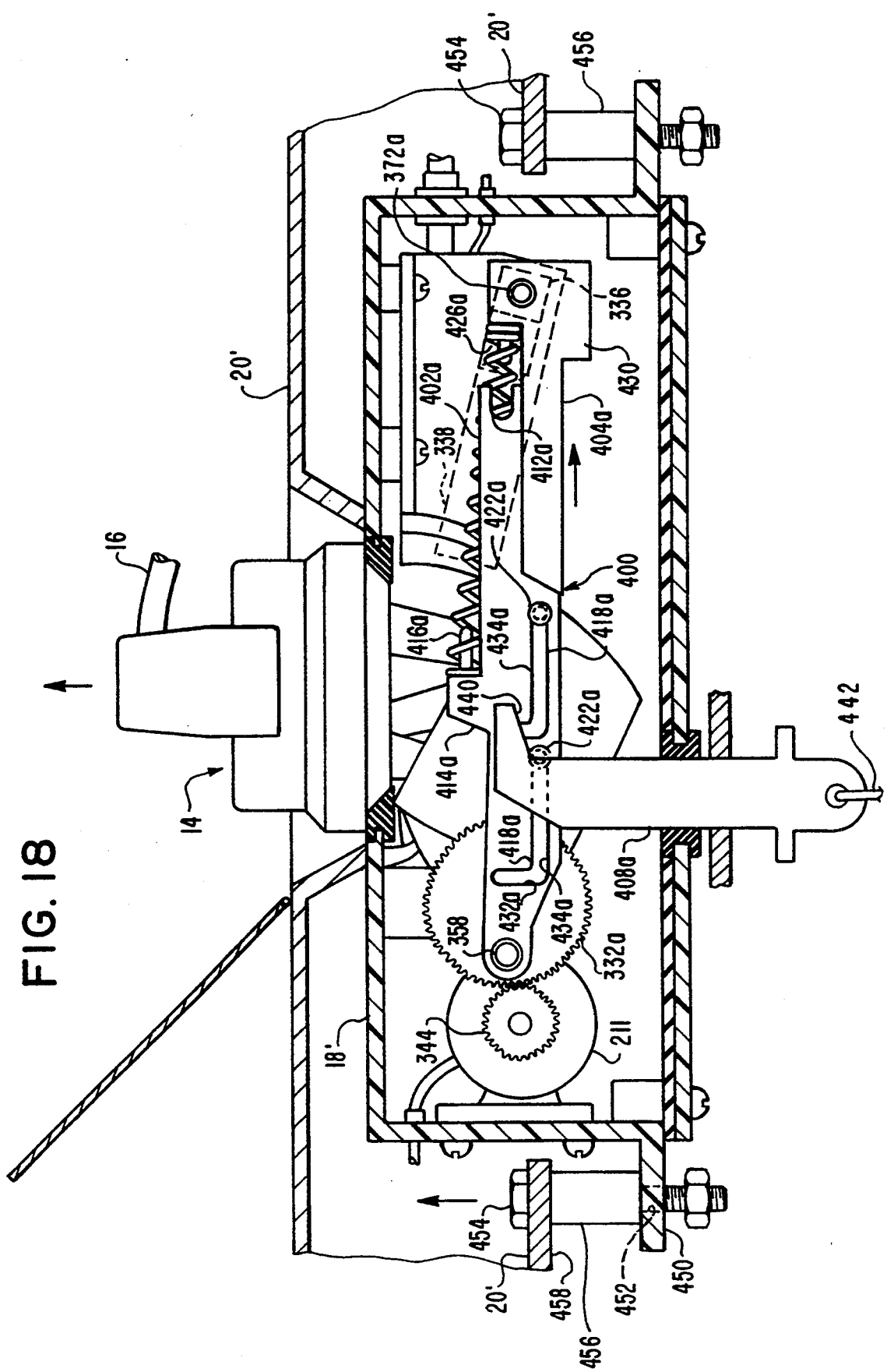
FIG. 18 is a partial top plan view of the receptacle illustrated in FIG. 17 with the modified drive link assembly illustrated in the tripped or break away position.
Figure 19:
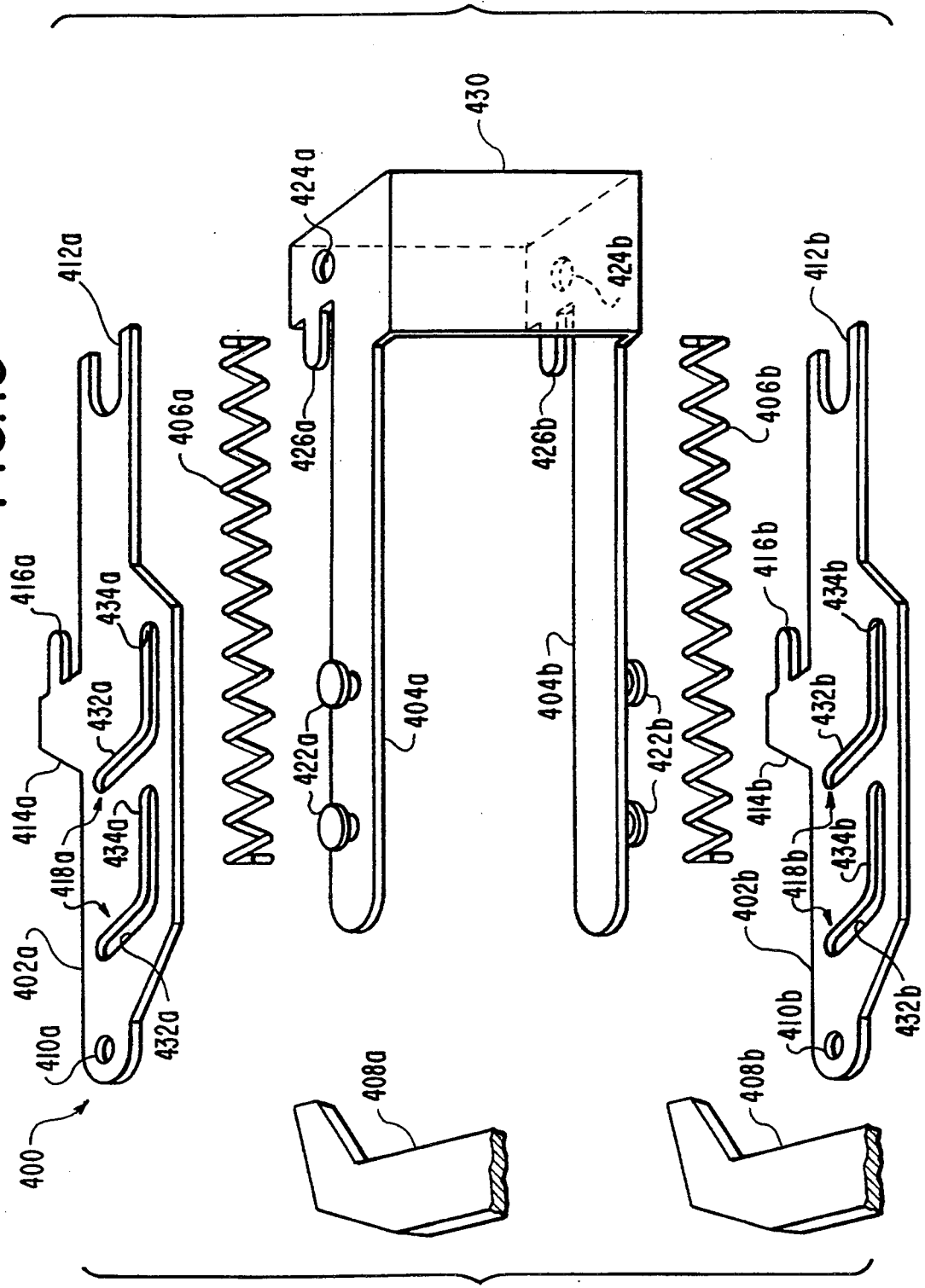
FIG. 19 is an exploded perspective view of the modified drive link assembly illustrated in FIGS. 17 and 18.

Second Embodiment of FIGS. 17–19

As seen in FIGS. 17–19, a second embodiment of an electrical receptacle 18′ in accordance with the invention is illustrated for use in conjunction with plug 14. Electrical receptacle 18′ is substantially identical to receptacle 18 of the first embodiment illustrated in FIGS. 1–16, except that drive links 334 have been replaced with a break-away drive assembly 400 and casing 200′ has been resiliently mounted to vehicle 20′ for limited movement. Accordingly, the construction and assembly of receptacle 18′ will not be discussed or illustrated in detail herein, except for the differences between receptacle 18 and 18′.

Drive link assembly 400 includes a pair of main or primary drive links 402a and 402b, and a pair of secondary drive links 404a and 404b slidably coupled to main drive links 402, a pair of compression springs 406a and 406b, and a pair of release hooks 408a and 408b coupled to vehicle 20′.

Drive links 402a and 402b are substantially identical, and thus only drive link 402a will be discussed in detail. Drive link 402a is an elongated, flat metallic plate having a hole 410a located at one end for receiving drive pin 358 of cam 332a, an open ended slot 412a at the other end of drive link 402a for receiving drive pin 372a of bail 336, a flange 414a extending outwardly approximately midway between opening 410a and slot 412a, a post 416a extending from flange 414a towards slot 412a for receiving one end of spring 406a, and a pair of L-shaped slots 418a located between opening 410a and slot 412a.

Secondary drive links 404a and 404b are substantially identical, and thus only secondary link 404a will be discussed in detail. Secondary drive link 404a is a substantially flat, metallic plate having a substantially L-shaped configuration, and includes a pair of headed pins 422a spaced along its length for connecting primary link 402a thereto, a drive pin hole 424a for receiving drive pin 372a of bail 336, and a post 426a extending therefrom for receiving one end of spring 406a thereon. Links 404a and 404b are rigidly connected together via a vertical plate 430 adjacent drive openings 424 so that drive links 404a and 404b rotate and reciprocate together.

Holes 424a and 424b are offset from posts 426a and 426b so that the forces of springs 406a and 406b act on drive links 404a and 404b to bias them in a clockwise direction as illustrated in FIGS. 17–19.

Each L-shaped slots 418a of drive link 402a has a first slot portion 432a extending substantially transverse to the normal reciprocating motion of drive link 402a, a second slot portion 434a extending from one end of slot portion 432a and substantially parallel to the normal reciprocating motion of drive link 402a. First slot portions 432a are preferably slightly curved, arcuate slots with their centers located at drive pin hole 424a when first and second links 402a and 404a are coupled together.

One of the headed pins 422a is slidably received in each of the L-shaped slots 418a with its head portion 436a being slightly larger than the width of slots 418a to retain primary drive link 402a and secondary link 404a together. Specifically, pins 422a and 422b are slidably received in slots 418a and 418b, respectively, so that primary drive links 402a and 402b and secondary drive links 404a and 404b can slide relative to one another. This allows the drive links formed by primary and secondary drive links 402a, 402b, 404a and 404b to have two effective lengths.

Release hooks 408a and 408b are substantially identical, and are either fixedly coupled to vehicle 20', or slidably coupled to vehicle 20' in a direction away from plug 14 to provide manual release. Preferably, each of the release hooks 408a and 408b has a release surface 440 at one end for engaging one of the pins 422a or 422b, a manual release cable 442 attached to its other end, and an intermediate stop flange 443 for engaging a portion of vehicle 20' to limit movement of release hook 408 in the direction towards plug 14.

Normally, release hooks 408a and 408b extend through a pair of slots 444 in vehicle 20', and through a pair of slots 445 in casing 200' so that each of the release surfaces 440 engages one of the pins 422a and 422b, when plug 14 and receptacle 18 are coupled together.

Accordingly, it will be apparent that either if an excessively high force is applied to cable 16 of plug 14, or if release cable 442 is pulled, then pins 422a and 422b along with secondary links 404a and 404b will move relative to first links 402a and 402b within L-shaped slots 418a and 418b. Specifically, casing 200' with primary drive links 402a and 402b are pulled outwardly by plug 14 and pins 422a and 422b remain stationary by hooks 408a and 408b when an excessively high force is applied to cable 16. However, pins 422a and 422b along with secondary drive links 404a and 404b move away from plug 14 and primary drive links 402a and 402b when release cable 442 is pulled.

Casing 200' has an annular flange 450 for mounting casing 200' to vehicle 20'. Specifically, flange 450 has four holes 452 (only two shown) for receiving a bolt 454 through each one of the openings 452. Each bolt 454 has a compliant or resilient tubular member 456 positioned between flange 450 of receptacle 18' and flange 458 of vehicle 20'. Compliant members 456 are substantially resilient to allow casing 200' to pull straight out or rotate slightly from vehicle 20' without damage thereto, but prevent the casing 200' from translating sideways or up and down to ensure that headed pins 422a and 422b do not disengage from release hooks 408a and 408b.

During normal operation, headed pins 422a and 422b remain in first slot portions 432a and 432b so that primary drive links 402a and 402b and secondary drive links 404a and 404b move together as one unit. However, upon application of an excessively high force on cable 16 of plug 14 or casing 200' of receptacle 18', pins 422a and 422b will move along first slot portions 432a and 432b to second slot portions 434a and 434b. Once pins 426a and 426b enter second slot portions 434a and 434b, springs 406a and 406b translate drive links 402a and 402b along their longitudinal axis relative to drive links 404a and 404b. Accordingly, bail 336 is moved by links 404a and 404b via springs 406a and 406b to retract contact pins 338 and communication connector 206 of receptacle 18' from terminal blocks 28 and communication connector 33 for disconnecting plug 14 from receptacle 18' without any damage thereto While only two embodiments have been chosen to illustrate the invention, it will be understood by those skilled in the art that various changes and modifications can be made herein without departing from the scope of the invention as defined in the appended claims.

What is claimed is:

1. An electrical connector assembly, the combination comprising:

a receptacle having a housing with an inlet cavity;

first electrical contact means coupled to said receptacle;

a plug with a housing sized to be received within said inlet cavity;

second electrical contact means coupled to said plug, one of said first and second contact means being movably coupled to engage the other of said first and second contact means after full insertion of said housing of said plug into said inlet cavity so that said housings of said receptacle and said plug remain stationary;

first cover means, coupled to said receptacle, for selectively covering said first contact means;

second cover means, coupled to said plug, for selectively covering said second contact means; and uncovering means, coupled to said receptacle, for selectively moving said first and second cover means to uncover said first and second contact means, respectively, to permit electrical coupling of said first contact means with said second contact means, after full insertion of said plug into said inlet cavity of said receptacle, said uncovering means including means for interconnecting said first and second cover means together for movement together after said plug is fully inserted into said inlet cavity.

2. An electrical connector assembly, the combination comprising:

a receptacle;

first electrical contact means coupled to said receptacle;

a plug;

second electrical contact means coupled to said plug;

first cover means, coupled to said receptacle, for selectively covering said first contact means;

second cover means, coupled to said plug, for selectively covering said second contact means; and uncovering means, coupled to said receptacle, for selectively moving said first and second cover means to uncover said first and second contact means, respectively, to permit electrical coupling of said first contact means with said second contact means, upon insertion of said plug into said receptacle, said first cover means of said receptacle having a substantially unobstructed cavity which is sized for receiving said second cover means of said plug therein with substantially no force being applied between said first and second cover means.

3. An electrical connector assembly according to claim 2, wherein said receptacle includes a first gasket for sealing said first cover means thereto, when said first cover means is covering said first contact means.

4. An electrical connector assembly according to claim 3, wherein
said plug includes a second gasket for sealing said second cover means thereto, when said second cover means is covering said second contact means.

5. An electrical connector assembly according to claim 4, wherein
said first gasket includes an annular sealing surface, and said second gasket includes an complementary annular sealing surface for contacting said sealing surface of said first gasket when said second cover means of said plug is fully inserted into said cavity of said first cover means.

6. An electrical connector assembly according to claim 1, wherein
said uncovering means includes motive means for automatically moving said first contact means relative to said second contact means for electrically connecting said first and second contact means together, upon insertion of said plug into said receptacle.

7. An electrical connector assembly, the combination comprising:
a receptacle;
first electrical contact means coupled to said receptacle;
a plug;
second electrical contact means coupled to said plug;
first cover means, coupled to said receptacle, for selectively covering said first contact means;
second cover means, coupled to said plug, for selectively covering said second contact means;
uncovering means, coupled to said receptacle, for selectively moving said first and second cover means to uncover said first and second contact means, respectively, to permit electrical coupling of said first contact means with said second contact means, upon insertion of said plug into said receptacle; and
motive means, coupled to one of said first and second contact means, for moving at least one of said first and second contact means in a direction transverse to the direction of insertion of said plug into said receptacle.

8. An electrical connector assembly according to claim 7, wherein
said motive means is coupled to said first contact means, and said first contact means includes at least one movable contact member coupled to said motive means for movement to engage said second contact means.

9. An electrical connector assembly according to claim 7, wherein
said motive means is coupled to said first contact means, and said first contact means includes a plurality of movable contact members coupled to said motive means and said second contact means includes a plurality of stationary contacts for electrical engagement with said movable contact members.

10. An electrical connector assembly according to claim 9, wherein
said first contact means includes a plurality of stationary tubular contacts with one of said movable contact members being slidably received in each of said stationary, tubular contacts.

11. An electrical connector assembly according to claim 1, further comprising
motive means, coupled to said uncovering means and said first contact means, for moving said uncovering means, and for subsequently moving said first contact means into electrical connection with said second contact means, upon full insertion of said plug into said receptacle.

12. An electrical connector assembly according to claim 11, wherein
said uncovering means includes switch means for detecting full insertion of said plug into said receptacle to permit said motive means to move said first and second cover means for uncovering said first and second contact means only after full insertion of said plug into said receptacle.

13. An electrical connector assembly according to claim 1, further comprising
break-away means, coupled to said receptacle, for disengaging said first contact means from said second contact means when coupled together and after application of an excessively high force on said plug which pulls said plug away from said receptacle.

14. An electrical connector assembly according to claim 13, wherein
said first contact means includes a movable contact member movably coupled to said receptacle for movement in a direction transverse to the direction of insertion of said plug into said receptacle for electrically connecting said first contact means to said second contact means.

15. An electrical connector assembly according to claim 1, wherein
said plug includes latching means for releasably locking said second cover means to said plug.

16. An electrical connector, comprising:
an electrically insulated housing;
electrical contact means coupled to said housing and arranged transversely relative to the direction of insertion with a mating electrical connector so that said electrical contact means will be aligned with a mating electrical contact means only after reaching a complete insertion position with a mating electrical connector;
cover means for selectively covering and uncovering said electrical contact means;
coupling means, coupled to said cover means and said housing, for movably coupling said cover means to said housing between a closed position to cover said contact means and an open position forming a space arranged transversely to the direction of insertion between said housing and said cover means to expose said contact means; and
means, coupled to said cover means, for preventing said cover means from being moved to expose said contact means until after reaching said complete insertion position with a mating electrical connector.

17. An electrical connector, comprising
an electrically insulated housing;
electrical contact means coupled to said housing;
cover means for selectively covering said electrical contact means;

coupling means, coupled to said cover means and said housing, for movably coupling said cover means to said housing; and means, coupled to said cover means, for preventing cover means from being moved to expose said contact means until after complete insertion with a mating electrical connector, said cover means including a cavity for receiving a mating cover of a mating electrical connector.

18. An electrical connector according to claim 16, further comprising uncovering means, coupled to said cover means, for selectively moving said cover means to uncover said contact means, upon insertion with a mating electrical connector.

19. An electrical connector according to claim 16, further comprising sealing means, coupled between said cover means and said housing, for completely sealing said cover means to said housing.

20. An electrical connector according to claim 16, further comprising motive means, coupled to said contact means, for moving said contact means in a direction transverse to the direction of insertion with a mating electrical connector.

21. An electrical connector according to claim 16, wherein said cover means has a substantially unobstructed cavity which is sized for receiving a cover of a mating electrical connector therein with substantially no force being applied therebetween.

22. An electrical connector according to claim 21, wherein said contact means includes a plurality of movable contact members and a plurality of stationary contacts for electrical engagement with said movable contact members.

23. An electrical connector according to claim 16, further comprising break-away means, coupled to said housing, for disengaging said contact means from a mating contact means when coupled together and after application of an excessively high break-away force on said housing.

24. An electrical connector according to claim 16, wherein said coupling means includes pivoting means for pivotally coupling said cover means to said housing.

25. An electrical connector according to claim 24, wherein said coupling means further includes spring means for normally biasing said cover means against said housing.

26. An electrical connector comprising:
an electrically insulated housing;
electrical contact means coupled to said housing;
cover means for selectively covering said electrical contact means;
coupling means, coupled to said cover means and said housing, for movably coupling said cover means to said housing; and
means, coupled to said cover means, for preventing said cover means from being moved to expose said contact means until after complete insertion with a mating electrical connector,
said means for preventing including a first latching surface coupled to said cover means, a second latching surface coupled to said housing for selectively engaging said first latching surface, and means for moving said first latching surface relative to said second latching surface in response to completion insertion of said electrical connector with a mating electrical connector.

27. An electrical connector according to claim 26, wherein said first latching surface is fixed coupled to a latch which is movable coupled to said cover means.

28. An electrical connector according to claim 27, wherein said retaining means further includes a first magnet movably coupled to said cover means for moving said latch upon placement near a magnet with opposite polarity.

29. An electrical connector according to claim 28, wherein said latch has a second magnet fixedly coupled thereto.

30. A method for making an electrical connection, comprising the steps of:

providing a first member with an electrical receptacle having a first housing, a first insulated cover means movably coupled to the first housing, and first electrical contact means coupled to the first housing;

providing a second member with a plug having a second housing, a second insulated cover means movably coupled to the second housing, and second electrical contact means coupled to the second housing;

selectively covering the first and second electrical contact means with the first and second insulated cover means respectively;

selectively uncovering the first and second electrical contact means by moving the first and second insulated cover means relative to the first and second contact means respectively;

fully inserting the plug of the second member into the receptacle of the first member before the step of uncovering the first and second electrical contact means such that the first and second housings remain stationary during the step of uncovering the first and second electrical contact means; and moving one of the first and second contact means for electrically coupling the first and second contact means together after the steps of fully inserting the plug into the receptacle and uncovering the first and second contact means.

31. A method for making an electrical connection according to claim 30, the step of electrically coupling includes the step of moving the first contact means relative to the second contact means after the step of fully inserting the plug into the receptacle.

32. A method for making an electrical connection, comprising the steps of:

providing a first member with an electrical receptacle having a first electrical contact means coupled thereto;

providing a second member with a plug having a second electrical contact means coupled thereto;

selectively covering and uncovering the first and second electrical contact means with first and second insulated cover means, respectively by moving the first and second insulated cover means relative to the first and second contact means respectively;

preventing movement of the first and second insulated cover means from exposing the first and second electrical contact means until after complete insertion of the plug into the receptacle so that the plug reaches a full insertion position in which the first and second contact means are aligned, fully inserting the plug of the second member into the receptacle of the first member in one direction to the full insertion position; and electrically coupling the first and second contact means together by translating said first contact means in a direction transverse to the one direction of insertion of the plug into the receptacle.

33. A method for making an electrical connection according to claim 30, wherein the step of selectively uncovering occurs after the step of fully inserting the plug into the receptacle and before the step electrically coupling.

34. A method for making an electrical connection, comprising the step of:

providing a first member with an electrical receptacle having first electrical contact means coupled thereto;

providing a second member with a plug having second electrical contact means coupled thereto;

selectively covering the first and second electrical contact means with first and second insulated cover means respectively;

selectively uncovering the first and second electrical contact means by moving the first and second insulated cover means relative to the first and second contact means respectively;

fully inserting the plug of the second member into the receptacle of the first member;

electrically coupling the first and second contact means together; and providing the first cover means with a cavity for receiving the second cover means therein.

35. A method for making an electrical connection according to claim 34, further comprising the step of sensing when second cover means is received in said first cover means.

36. A method for making an electrical connection according to claim 35, further comprising the step of providing the second cover means with latching means which cooperates with the sensing means to only unlatch the second cover after the step of fully inserting the plug into the receptacle.

37. An electrical connector system for recharging a battery of an electric vehicle, the combination comprising:

a first electrical connector having a first housing and first electrical contact means coupled to a power source;

a second electrical connector having a second housing with an inlet cavity and second electrical contact means coupled to the battery of the electric vehicle;

first cover means, coupled to said first housing of said first electrical connector, for selectively covering said first contact means;

second cover means, coupled to said second housing of said second electrical connector, for selectively covering said second contact means;

uncovering means, coupled to said second electrical connector, for selectively moving said first and second cover means to uncover said first and second contact means, respectively, to permit electrical coupling of said first contact means with said second contact means, after full insertion of said first electrical connector into said inlet cavity of said second electrical connector to a complete insertion position such that said first and second housings remain stationary in said complete insertion position during uncovering of said first and second contact means;

actuation means for moving one of said first and second contact means relative to the other of said first and second contact means after full insertion of said first electrical connector into said inlet cavity to said complete insertion position so that said first and second housings remain stationary during electrical coupling of said first and second contact means in said complete insertion position; and sensing means for determining full insertion of said first electrical connector into said inlet cavity, said sensing means being operatively coupled to said actuation means to permit said actuation means to move one of said first and second contact means.

38. An electrical system according to claim 37, wherein said uncovering means includes motive means for automatically moving said second contact means relative to said first contact means for electrically connecting said first and second contact means together, upon insertion of said first electrical connector relative to said second electrical connector.

39. An electrical connector system, for recharging a battery of an electric vehicle, the combination comprising:

a first electrical connector having first electrical contact means coupled to a power source;

a second electrical connector having second electrical contact means coupled to the battery of the electric vehicle;

first cover means, coupled to said first electrical connector, for selectively covering said first contact means;

second cover means, coupled to said second electrical connector, for selectively covering said second contact means;

uncovering means, coupled to said second electrical connector, for selectively moving said first and second cover means to uncover said first and second contact means, respectively, to permit electrical coupling of said first contact means with said second contact means, upon insertion of said first electrical connector relative to said second electrical connector; and motive means, coupled to one of said first and second contact means, for moving at least one of said first and second contact means in a direction transverse to the direction of insertion of first and second connectors together.

40. An electrical connector system according to claim 37, wherein said uncovering means includes switch means for detecting full insertion of said first and second electrical connectors together to permit said first and second cover means to move to a position uncovering said first and second contact means only after full insertion.

41. An electrical connector system according to claim 37, further comprising break-away means, coupled to said second electrical connector, for disengaging said first contact means from said second contact means when coupled together and after application of an excessively high force on said first electrical connector which pulls said plug away from said second electrical connector.

42. An electrical connector system for recharging a battery of an electric vehicle, the combination, comprising:
  a first electrical connector having first electrical contact means coupled to a power source;
  a second electrical connector having second electrical contact means coupled to the battery of the electric vehicle;
  first cover means, coupled to said first electrical connector, for selectively covering said first contact means;
  second cover means, coupled to said second electrical connector, for selectively covering said second contact means;
  uncovering means, coupled to said second electrical connector, for selectively moving said first and second cover means to uncover said first and second contact means, respectively, to permit electrical coupling of said first contact means with said second contact means, upon insertion of said first electrical connector relative to said second electrical connector; and
  said first electrical connector including unlatching means for releasably unlocking said second cover means of said second electrical connector.

43. An electrical connector assembly, the combination comprising:
  a first electrical connector with a first housing and first electrical contact means;
  a second electrical connector with a second housing and second electrical contact means for electrically mating with said first contact means;
  first cover means, coupled to said first electrical connector, for selectively concealing covering said first contact means;
  second cover means, coupled to said second electrical connector, for selectively covering said second contact means; and
  coupling means, associated with said first and second housings, for removably coupling said first and second electrical connectors together, said coupling means including
    hook means coupled to one of said first and second electrical connectors, and
    pivot means coupled to the other of said first and second electrical connectors for pivotally receiving said hook means.

44. An electrical connector assembly according to claim 43, wherein
  said first electrical connector is a plug with said hook means coupled thereto.

45. An electrical connector assembly according to claim 44, wherein
  said second electrical connector is a receptacle with said pivot means coupled thereto.

46. An electrical connector assembly according to claim 45, wherein
  said pivot means includes a horizontally mounted pin.

47. An electrical connector assembly according to claim 43, further comprising
  motive means, coupled to one of said first and second contact means, for moving at least one of said first and second contact means in a direction transverse to the direction of insertion of said first and second electrical connectors together.

48. An electrical connector assembly according to claim 43, further comprising
  break-away means, coupled to said first electrical connector, for disengaging said first contact means from said second contact means when coupled together and after application of an excessively high force between said first and second contact means which pulls said second electrical connector away from said first electrical connector.

49. A method of coupling a power source of electrical power to an electrical load, comprising the steps of:
  a) forming an enclosure with an open end and wall portions to provide a normally enclosed interior, one of said wall portions being a displaceable wall portion and the power source being supplied to the load through the open end proximate the displaceable wall portion,
  b) mounting an electrical contact for movement between first and second positions respectively outwardly and inwardly of the interior, said contact being normally at said first position,
  c) positioning the one wall portion opposite said contact to isolate said contact from the power source when said contact is at said first position,
  d) coupling the electrical load to said contact to receive electrical power therefrom,
  e) displacing said one wall portion to allow movement of said contact to said second position and thereafter,
  f) moving said contact to said second position to receive the electrical power from the power source,
  g) sensing the presence of the power source of electrical power in the interior of the enclosure, and
  h) utilizing the sensed presence of the source to cause displacement of said one wall portion.

50. The method according to claim 49, wherein
  step of moving said contact is achieved by the step of interconnecting said displaceable wall portion and the contact.

51. An electrical inlet for coupling a source of electrical power to an electrical load, comprising:
  electrical contact means electrically connected to said electrical load;
  an enclosure formed with an opening, an interior side wall and an end wall disposed transverse and adjacent said side wall inwardly of the opening, whereby the end and side walls normally cooperate to form a fully enclosed interior, the power being conducted through the opening to a location proximate one of the walls;
  first means for movably mounting said contact means opposite said one of said walls for movement toward and away from the enclosure interior;
  second means, coupled to said first means, for moving one of said walls from a first position to a second position for at least partially uncovering said contact means in response to an actuating signal;
  third means, responsive to said second means, for moving the uncovered contact means toward said enclosure interior and toward said location for receiving electrical power from said source of electrical power in said enclosure; and
  sensing means, on the inlet, for sensing the introduction of the source of electrical power into said enclosure and producing said actuating signal for uncovering said contact means.

52. The inlet according to claim 51, wherein
said enclosure has a generally U-shaped cross-section and further including cover means for selectively covering the opening of said enclosure.

53. The inlet according to claim 51, and further comprising:
fourth means, coupled to said second means responsive to the absence of said output signal, for restoring said one of the end walls to the first position.

54. The inlet according to claim 51, wherein
said one of the walls is said end wall.

55. An electrical connector for receiving a mating electrical connector, comprising:
a contact housing adapted to receive a mating electrical connector;
a first set of electrical contacts coupled to said contacts housing and adapted to be electrically coupled to mating electrical contacts of a mating electrical connector; and
a breakaway mechanism coupled to said contact housing for disengaging said first electrical contacts from the mating electrical contacts when coupled together and after application of a predetermined separation force occurs between said contact housing and the mating electrical connector, said breakaway mechanism including
a coupling arrangement movably coupling said contact housing to a support for limited movement relative therebetween only after application of the predetermined separation force occurs between said contact housing and the mating electrical connector, and
a disconnecting arrangement coupled to said contact housing and being responsive to the limited movement between the support and said connector housing for disconnecting electrical energy being transferred from said first electrical contacts to the mating electrical contacts and for releasing said first electrical contacts from the mating electrical contacts.

56. An electrical connector according to claim 55, wherein
said disconnecting arrangement includes a drive assembly for movably coupling said first electrical contacts to said contact housing for engaging the mating electrical contacts.

57. An electrical connector according to claim 56, wherein
said disconnecting arrangement further includes a retracting member coupled to said first electrical contacts for retracting said first electrical contacts in response to the limited movement between the support and said contact housing.

58. An electrical connector according to claim 57, wherein
said contact housing includes an inlet cavity for receiving a portion of the mating electrical connector therein.

59. An electrical connector according to claim 58, further comprising
a cover movably coupled to said contact housing for selectively covering and exposing said first electrical contacts.

60. An electrical connector according to claim 55, wherein
said coupling arrangement includes at least one compliant member positioned between said contact housing and the support to allow the limited movement between said contact housing and the support.

* * * * *